(12) United States Patent
Chen et al.

(10) Patent No.: US 12,506,511 B2
(45) Date of Patent: Dec. 23, 2025

(54) COMB OFFSET HOPPING FOR SRS

(71) Applicant: QUALCOMM Incorporated, San Diego, CA (US)

(72) Inventors: Yitao Chen, San Diego, CA (US); Mostafa Khoshnevisan, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/817,939

(22) Filed: Aug. 5, 2022

(65) Prior Publication Data

US 2024/0048175 A1 Feb. 8, 2024

(51) Int. Cl.
 *H04B 1/7143* (2011.01)
 *H04B 1/715* (2011.01)
 *H04L 5/00* (2006.01)

(52) U.S. Cl.
 CPC .......... *H04B 1/7143* (2013.01); *H04B 1/715* (2013.01); *H04L 5/001* (2013.01); *H04L 5/0048* (2013.01); *H04B 2001/7154* (2013.01)

(58) Field of Classification Search
 CPC ........ H04B 1/69; H04B 1/713; H04B 1/7143; H04B 1/715; H04B 2001/7154; H04L 5/001; H04L 5/0005; H04L 5/0007; H04L 5/0012; H04L 5/0045; H04L 5/0047; H04L 5/0048
 See application file for complete search history.

(56) References Cited

U.S. PATENT DOCUMENTS

| | | | |
|---|---|---|---|
| 9,414,319 B2 * | 8/2016 | Chen | H04W 52/04 |
| 10,405,305 B2 * | 9/2019 | Hosseini | H04L 5/0048 |
| 10,750,485 B2 * | 8/2020 | Hwang | H04L 5/0053 |
| 10,756,868 B2 * | 8/2020 | Chen | H04W 72/0446 |
| 10,778,315 B2 * | 9/2020 | Wong | H04L 5/0048 |
| 11,039,433 B2 * | 6/2021 | Wang | H04B 1/713 |
| 11,063,652 B2 * | 7/2021 | Xiong | H04B 7/088 |

(Continued)

FOREIGN PATENT DOCUMENTS

| | | |
|---|---|---|
| EP | 3958624 A1 | 2/2022 |
| EP | 4138325 A1 | 2/2023 |

(Continued)

OTHER PUBLICATIONS

International Search Report and Written Opinion—PCT/US2023/026861—ISA/EPO—Oct. 19, 2023.

(Continued)

*Primary Examiner* — James M Perez
(74) *Attorney, Agent, or Firm* — Procopio, Cory, Hargreaves & Savitch LLP/Qualcomm Incorporated

(57) ABSTRACT

A UE may be configured with at least one SRS hopping configuration associated with an SRS hopping pattern, and the UE may obtain the SRS hopping pattern based on the at least one SRS hopping configuration and at least one hopping offset. Here, the SRS hopping pattern may include one or more subsets of hopping patterns and each subset of hopping patterns including a subset of consecutive SRS transmission occasions may be associated with a hopping offset. The UE may transmit a set of SRS across a plurality of SRS transmission occasions based on the SRS hopping pattern.

32 Claims, 15 Drawing Sheets

(56) References Cited

U.S. PATENT DOCUMENTS

| | | | | |
|---|---|---|---|---|
| 11,115,242 | B2* | 9/2021 | Akkarakaran | H04W 52/00 |
| 11,121,739 | B2* | 9/2021 | Manolakos | H04L 5/0007 |
| 11,184,195 | B2* | 11/2021 | Zhang | H04L 5/0012 |
| 11,196,523 | B2* | 12/2021 | Liu | H04L 5/0051 |
| 11,277,238 | B2* | 3/2022 | Chen | H04L 27/26 |
| 11,310,023 | B2* | 4/2022 | Manolakos | H04L 5/005 |
| 11,337,194 | B2* | 5/2022 | Hwang | H04L 5/0055 |
| 11,431,454 | B2* | 8/2022 | Matsumura | H04W 72/0446 |
| 11,431,527 | B2* | 8/2022 | Zhang | H04W 80/08 |
| 11,457,451 | B2* | 9/2022 | Matsumura | H04W 72/21 |
| 11,477,809 | B2* | 10/2022 | Hosseini | H04L 5/0094 |
| 11,509,372 | B2* | 11/2022 | Liu | H04B 1/713 |
| 11,552,763 | B2* | 1/2023 | Chen | H04W 72/20 |
| 11,601,945 | B2* | 3/2023 | Bachu | H04L 69/323 |
| 11,641,642 | B2* | 5/2023 | Levitsky | H04W 24/10 370/329 |
| 11,729,782 | B2* | 8/2023 | Zhang | H04W 72/23 370/336 |
| 11,757,680 | B2* | 9/2023 | Zhang | H04L 5/0012 370/329 |
| 11,777,764 | B2* | 10/2023 | Sun | H04L 5/0048 370/430 |
| 11,824,806 | B2* | 11/2023 | Xu | H04L 5/0051 |
| 12,107,783 | B2* | 10/2024 | Zhang | H04L 27/261 |
| 12,113,738 | B2* | 10/2024 | Xu | H04B 7/0626 |
| 12,149,471 | B2* | 11/2024 | Munier | G01S 1/0428 |
| 12,368,551 | B2* | 7/2025 | Wang | H04W 52/42 |
| 2011/0098054 | A1* | 4/2011 | Gorokhov | H04B 7/024 455/422.1 |
| 2011/0110398 | A1* | 5/2011 | Zhang | H04L 5/0051 370/252 |
| 2011/0280220 | A1* | 11/2011 | Jia | H04W 56/00 370/335 |
| 2013/0322280 | A1* | 12/2013 | Pi | H04W 56/0005 370/252 |
| 2014/0036809 | A1* | 2/2014 | Xu | H04W 52/325 370/329 |
| 2015/0110037 | A1* | 4/2015 | Wu | H04L 5/0048 370/329 |
| 2018/0227949 | A1* | 8/2018 | Tiirola | H04W 74/04 |
| 2018/0317256 | A1* | 11/2018 | Um | H04L 27/2602 |
| 2018/0324777 | A1* | 11/2018 | Wang | H04B 1/713 |
| 2019/0109732 | A1* | 4/2019 | Choi | H04L 5/0051 |
| 2019/0158244 | A1* | 5/2019 | Shin | H04L 5/0048 |
| 2019/0174525 | A1* | 6/2019 | Kwak | H04L 25/0224 |
| 2019/0199555 | A1* | 6/2019 | Munier | H04L 5/0096 |
| 2019/0372734 | A1* | 12/2019 | Choi | H04B 7/0628 |
| 2020/0029325 | A1* | 1/2020 | Hwang | H04L 27/26 |
| 2020/0213161 | A1* | 7/2020 | Zhang | H04L 5/0048 |
| 2020/0228213 | A1* | 7/2020 | Masal | H04L 5/14 |
| 2020/0229180 | A1* | 7/2020 | Liu | H04L 5/0092 |
| 2020/0235877 | A1* | 7/2020 | Manolakos | H04W 72/04 |
| 2020/0288461 | A1* | 9/2020 | Hwang | H04L 5/0053 |
| 2020/0313932 | A1* | 10/2020 | Sun | H04W 74/0808 |
| 2021/0105040 | A1* | 4/2021 | Manolakos | H04B 1/713 |
| 2021/0168800 | A1* | 6/2021 | Matsumura | H04L 5/0048 |
| 2021/0266128 | A1* | 8/2021 | Zhang | H04B 7/0617 |
| 2022/0360474 | A1* | 11/2022 | Zhang | H04L 5/0092 |
| 2023/0050730 | A1* | 2/2023 | Wang | H04L 5/0091 |
| 2023/0136464 | A1* | 5/2023 | Wang | H04L 5/0048 370/329 |
| 2023/0147157 | A1* | 5/2023 | Ibrahim | H04L 5/14 370/329 |
| 2023/0155765 | A1* | 5/2023 | Zhang | H04L 5/0012 370/329 |
| 2023/0179365 | A1* | 6/2023 | Nam | H04L 5/0091 375/133 |
| 2023/0208583 | A1* | 6/2023 | Xu | H04W 72/04 370/230 |
| 2023/0291626 | A1* | 9/2023 | Chen | H04L 27/26035 |
| 2023/0318768 | A1* | 10/2023 | Khoshnevisan | H04B 1/713 370/329 |
| 2023/0396387 | A1* | 12/2023 | Harrison | H04L 5/0094 |
| 2024/0014960 | A1* | 1/2024 | Khoshnevisan | H04L 5/0048 |
| 2024/0048175 | A1* | 2/2024 | Chen | H04L 5/0048 |
| 2024/0056339 | A1* | 2/2024 | Lee | H04L 27/2607 |
| 2024/0080155 | A1* | 3/2024 | Xu | H04L 5/0048 |
| 2024/0187184 | A1* | 6/2024 | Gao | H04L 27/26035 |
| 2025/0015952 | A1* | 1/2025 | Shibaike | H04W 72/04 |
| 2025/0030515 | A1* | 1/2025 | Zhang | H04B 7/0617 |
| 2025/0038913 | A1* | 1/2025 | Munier | H04L 5/0048 |
| 2025/0089010 | A1* | 3/2025 | Yu | H04L 5/0094 |
| 2025/0089011 | A1* | 3/2025 | Yu | H04W 64/00 |
| 2025/0119252 | A1* | 4/2025 | Davydov | H04J 13/0062 |

FOREIGN PATENT DOCUMENTS

| | | |
|---|---|---|
| WO | 2020213126 A1 | 10/2020 |
| WO | 2021155818 A1 | 8/2021 |
| WO | 2021208779 A1 | 10/2021 |

OTHER PUBLICATIONS

Qualcomm Incorporated: "SRS enhancement for TDD CJT and 8 Tx operation", 3GPP TSG RAN WG1 #112, R1-2301399, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 26 Pages, XP052248532.

* cited by examiner

COMB OFFSET HOPPING FOR SRS

TECHNICAL FIELD

The present disclosure relates generally to communication systems, and more particularly, to wireless communication including comb offset hopping for sounding reference signal (SRS) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) configured to receive at least one sounding reference signal (SRS) hopping configuration from a network node, obtain an SRS hopping pattern based on the at least one SRS hopping configuration and at least one hopping offset, the SRS hopping pattern including one or more subsets of hopping patterns including a subset of consecutive SRS transmission occasions associated with a hopping offset of the at least one hopping offset, and transmit a set of SRS across a plurality of SRS transmission occasions based on the SRS hopping pattern.

In an aspect of the disclosure, a method, a computer-readable medium, and an apparatus are provided. The apparatus may include a network node configured to transmit at least one SRS hopping configuration for a UE, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and obtain a set of SRS across a plurality of SRS transmission occasions based on the SRS hopping pattern.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
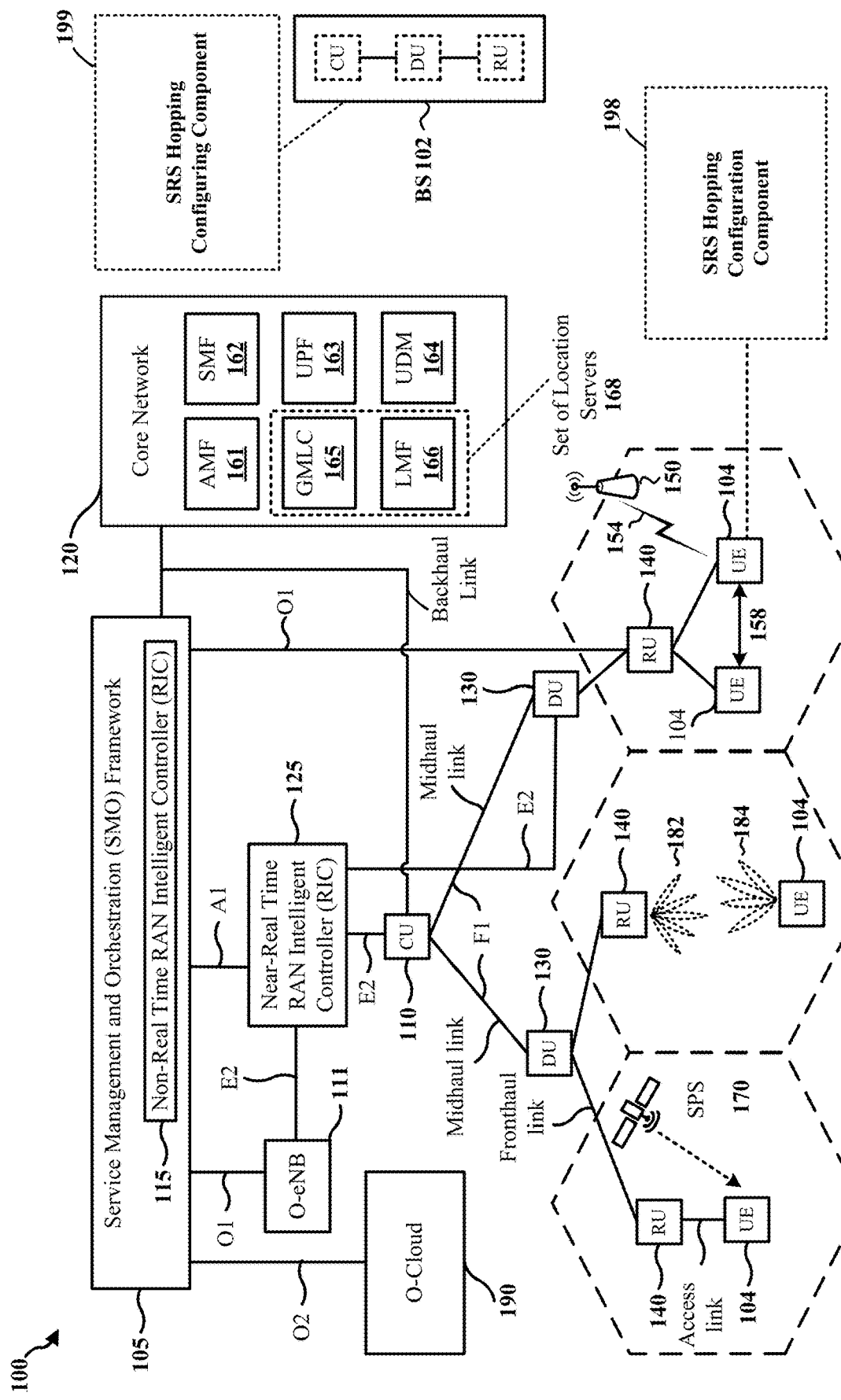
FIG. 1 is a diagram illustrating an example of a wireless communications system and an access network.

Wireless communication systems may support user equipments (UEs) configured for sounding reference signal (SRS) transmissions to multiple cells or transmit receive points (TRPs), and a large number of UE performing SRS transmission to different cells or TRPs may cause inter-cluster interference. In some aspects of the current disclosure, a comb offset hopping may be provided as an example of the interference randomization mechanism. The examples may provide randomization while maintaining certain property of the staggered SRS comb pattern with uniformly spaced comb offsets, so that increased number of REs may be sounded uniformly.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a SRS hopping configuration component 198 configured to receive at least one SRS hopping configuration from a network node, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and transmit a set of SRS across a plurality of SRS transmission occasions based on the SRS hopping pattern. In certain aspects, the base station 102 may include a SRS hopping configuring component 199 configured to transmit at least one SRS hopping configuration for a UE, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and obtain a set of SRS across a plurality of SRS transmission occasions based on the SRS hopping pattern. Although the following description may be focused on 5G NR, the concepts described herein may be applicable to other similar areas, such as LTE, LTE-A, CDMA, GSM, and other wireless technologies.

Figure 2:
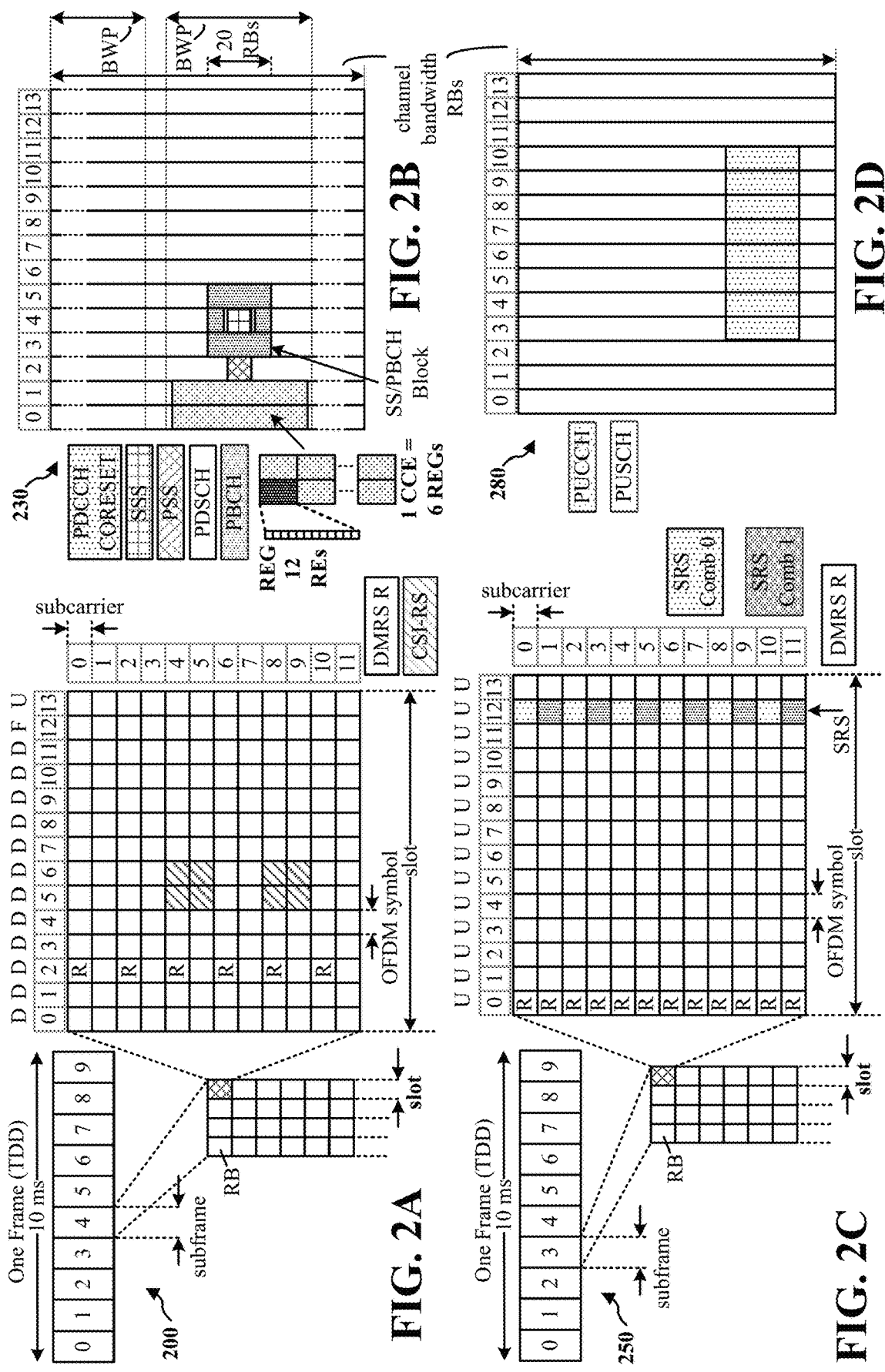
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[\text{kHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *$ 15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
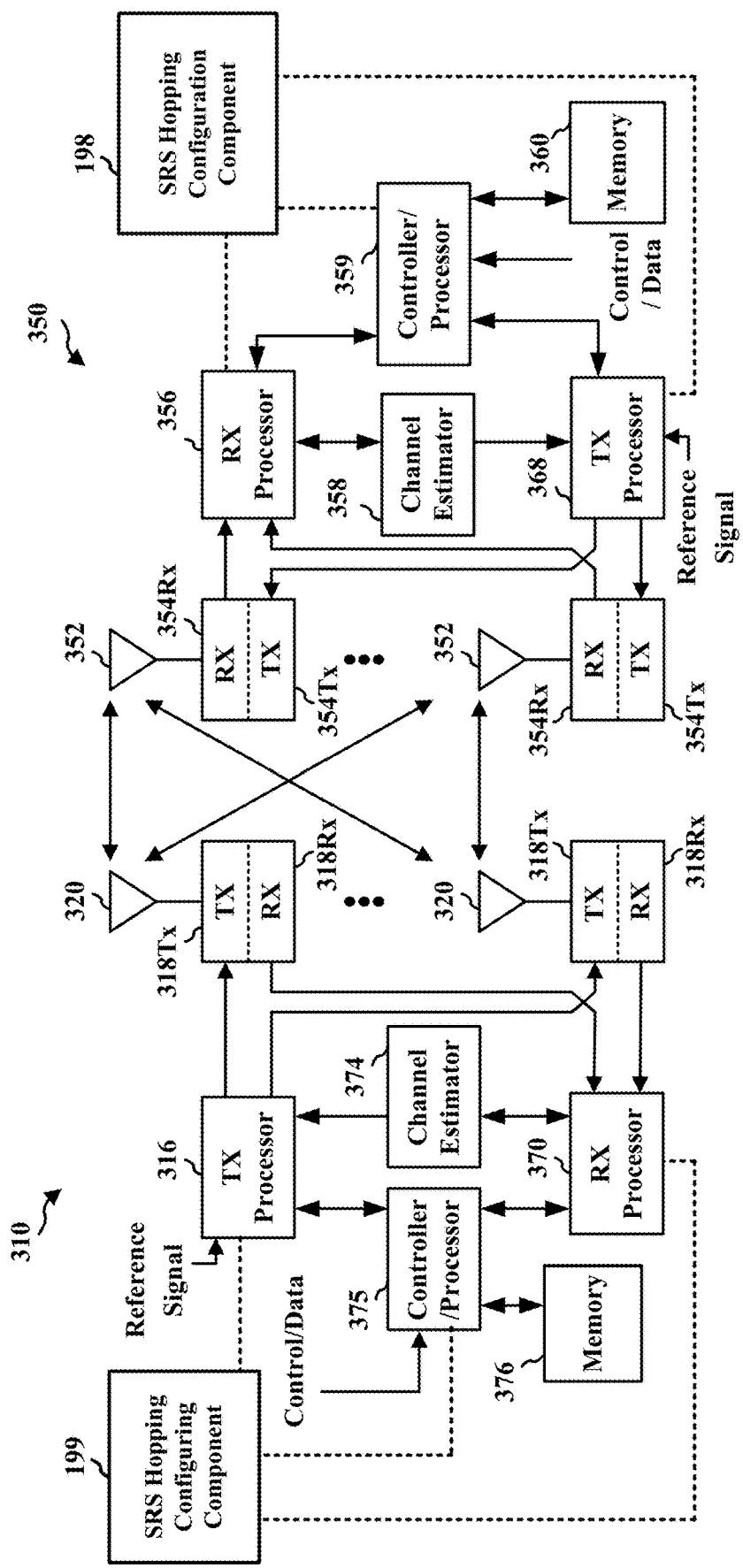
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SRS hopping configuration component 198 of FIG. 1. At least one of the TX processor 316, the RX processor 370, and the controller/processor 375 may be configured to perform aspects in connection with the SRS hopping configuring component 199 of FIG. 1.

Figure 4:
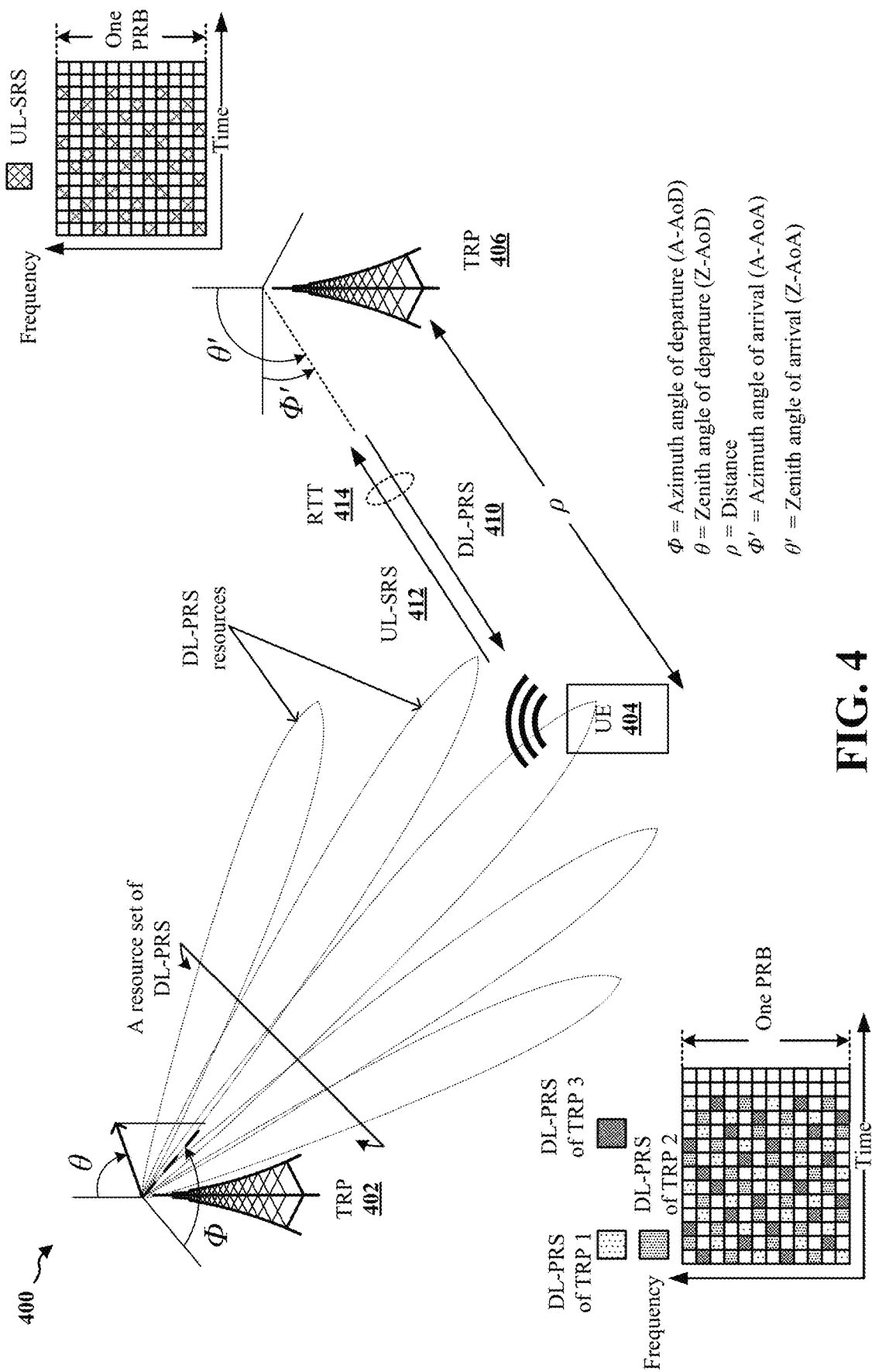
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A base sequence for a SRS transmission may be based on the SRS sequence identity $n_{ID}^{SRS}$ configured per SRS resource and whether group hopping, sequence hopping, or neither is configured (configuration per SRS resource). For the SRS, v corresponds to a sequence index, and u corresponds to a group index. In some aspects, when neither group hopping nor sequence hopping is configured, $u=n_{ID}^{SRS}$ mod 30 and v=0 are used for the group index and sequence index for the SRS base sequence, and the base sequence is fixed across all OFDM symbols in all slots for SRS transmission in that SRS resource. The network (e.g., via network node) may assign $n_{ID}^{SRS}$ to different SRS resources of different UEs across the same/different cells to avoid interference (interference planning). For group hopping, the sequence index v=0 and the group index u may be pseudo-randomly selected in every OFDM symbol of the SRS resource and in every slot occupied by the resource. The pseudo-random sequence c(i) governing the group hopping may be initialized as $c_{init}=n_{ID}^{SRS}$ at the beginning of each radio frame. This may include interference randomization by hopping across 30 groups.

For sequence hopping, the group index $u=n_{ID}^{SRS}$ mod 30 may be the same as when hopping is not used. However, the sequence index v may be pseudo-randomly selected between 0 and 1 in each OFDM symbol of the SRS resource and in every slot occupied by the resource. Again, the pseudo-random sequence c(i) governing the sequence hopping may be initialized by $c_{init}=n_{ID}^{SRS}$ at the beginning of each radio frame. Interference randomization by hopping across two sequences with interference planning across groups may be supported. In some examples, if a variable for group or sequence hopping, which may be referred to as "grouporSequenceHopping", equals 'neither,' then neither group nor sequence hopping may be used for the SRS transmission.

Figure 5:
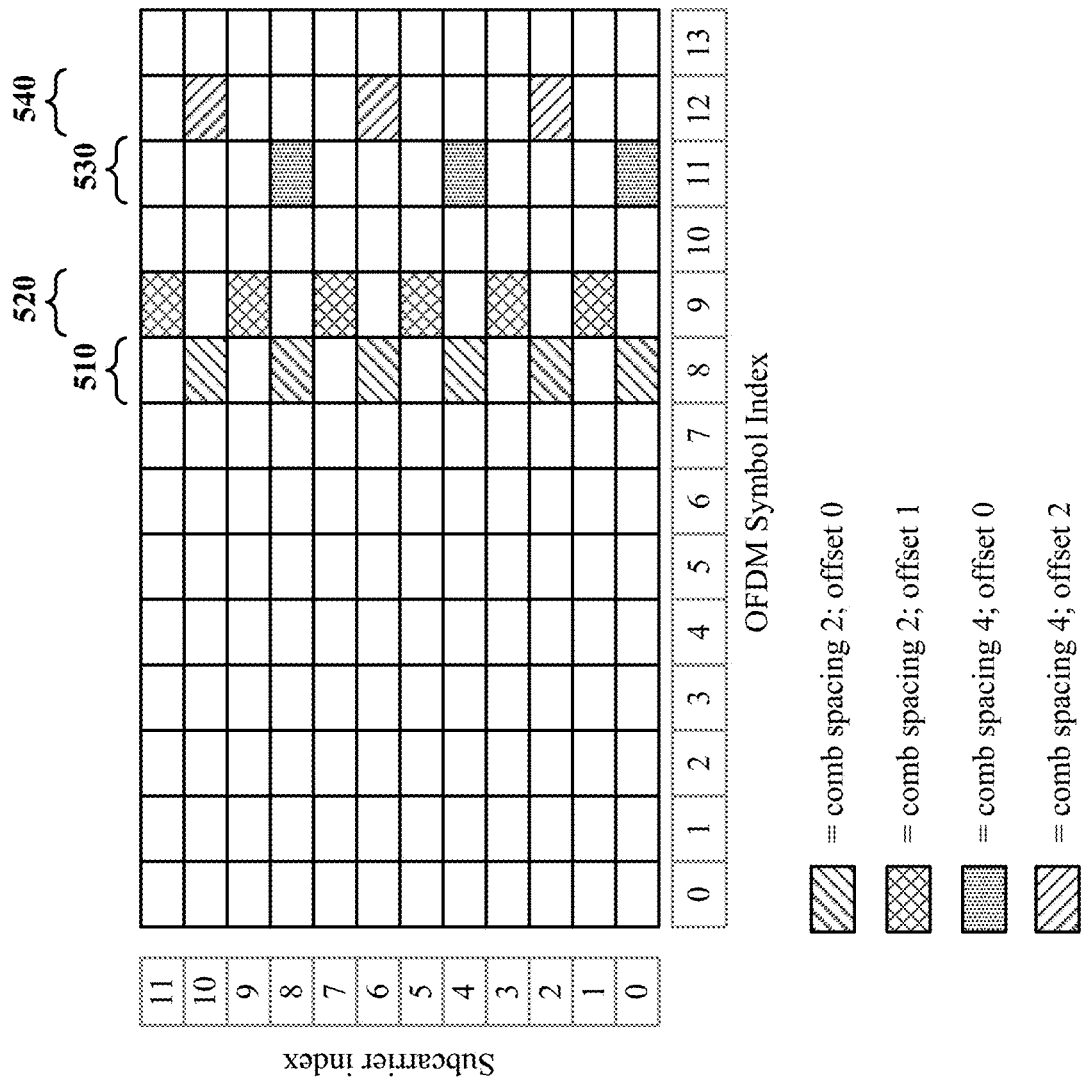
FIG. 5 illustrates an example of SRS comb patterns for SRS transmissions.

SRS may be transmitted using a comb pattern. Aspects of an SRS comb pattern are described in connection with FIG. 2C. FIG. 5 illustrates an example of SRS comb patterns 500 for SRS transmissions. The UE may receive, from a network node, at least one configuration of the SRS transmissions. In one example, the at least one configuration may indicate SRS resource(s) or SRS resource set(s) for the SRS transmissions or other parameters for the SRS transmissions. The at least one configuration may include a comb spacing (or a comb spacing number) or a comb offset. Here, the comb spacing may refer to a separation in frequency domain between SRS transmissions within a symbol, and the comb offset may refer to a starting subcarrier within a RB relative to a base subcarrier index (e.g., subcarrier index 0). In one example, the comb spacing ($K_{TC}$) may be configured as 2, 4, or 8 per SRS resource, which is the spacing between two SRS REs within a OFDM symbol. In another example, the comb offset ($\bar{k}_{TC}$) may be configured as 0, 1, . . . , ($K_{TC}$–1) per SRS resource, which may determine the SRS REs (e.g., the starting RE when SRS occupies every $K_{TC}$ RE within the sounding BW once starting RE is determined).

For example, the SRS comb pattern 500 may include a first SRS comb pattern 510, a second SRS comb pattern 520, a third SRS comb pattern 530, and a fourth SRS comb pattern 540. The first SRS comb pattern 510 indicates that comb spacing is 2 and the comb offset is 0. Based on the offset of 1, the first SRS comb pattern 510 and the second SRS comb pattern 520 may have a staggered pattern. The second SRS comb pattern 520 includes a comb spacing of 2 and the comb offset of 1. The third SRS comb pattern 530 includes a comb spacing of 4 and the comb offset of 0. The fourth SRS comb pattern 540 includes a comb spacing of 4 and the comb offset of 2. Based on the offset of 2, the third SRS comb pattern 530 and the fourth SRS comb pattern 540 may have a staggered pattern.

The UE may receive the at least one SRS configuration from the network entity, e.g., in RRC signaling. In some aspects, this may include the at least one SRS configuration including various parameters (e.g., the comb offset, the comb spacing, etc.) that are based on various formulas. In one example, the parameter $k_{offset}^{l'}$ may be currently used for SRS for positioning (to have a sample of all REs within different symbols of the SRS resource), and for SRS transmissions other than the SRS for positioning, the parameter $k_{offset}^{l'}$ may be set to 0. In the case of SRS for positioning, offset may be configured for the SRS staggering. Here, the SRS triggering is different from hopping based on pseudo-random sequence discussed for the purpose of interference randomization.

The frequency-domain starting position $k_0^{(p_i)}$ (e.g., related to the comb spacing) may be defined as $k_0^{(p_i)} = \bar{k}_0^{(p_i)} + n_{offset}^{FH} + n_{offset}^{RPFS}$, where $\bar{k}_0^{(p_i)} = n_{shift} N_{sc}^{RB} + (\bar{k}_{TC}^{(p_i)} + k_{offset}^{l'}) \mod K_{TC}$. Here, the offset $k_{offset}^{l'}$ for the SRS may be a function of $K_{TC}$ and l may follow Table 2.

multi-port SRS transmission, all ports may be configured to be transmitted on the same REs associated with the SRS resources. There may be two exceptions. In one exception, when there are four SRS ports with a comb spacing being eight, and the maximum number of six cyclic shifts is applied, the four SRS ports may not be evenly distributed over the six (6) cyclic shifts. In another exception, there may be four SRS ports divided into two groups and if the configured cyclic shift is in the second half, the first half and the second half of the four SRS ports may be configured on different comb offset.

Figures 6A, 6B, 6C:
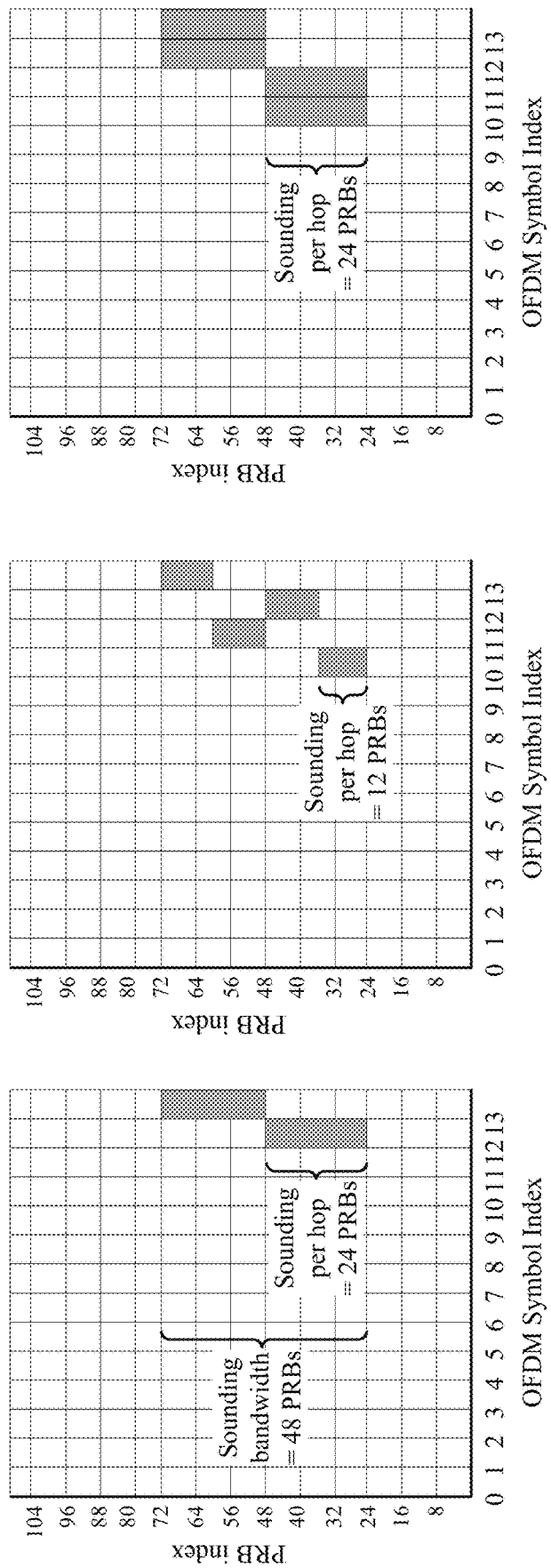
FIGS. 6A, 6B, and 6C illustrate examples of frequency hopping for SRS transmissions.

FIGS. 6A, 6B, and 6C illustrate examples 600, 630, and 660 of frequency hopping for SRS transmissions. Each SRS resource may be configured with N OFDM symbols and R repetitions. That is, N number of OFDM symbols may be configured to SRS transmissions (or SRS Transmission occasions), and each SRS transmission may be repeated with R repetition factor (e.g., repetition number). If R<N, the SRS resources may include N/R frequency hops within the SRS resource. Here, the number of OFDM symbols (e.g., N) for SRS transmissions and the repetition factor (e.g., R) may be determined based on the following table 3. Here, the number of OFDM symbols represents how many OFDM symbols are included in the SRS transmissions.

TABLE 3 number of OFDM symbols for SRS transmissions and repetition factor

| N per SRS resource | R = Repetition factor |
|---|---|
| 1 | 1 |
| 2 | 1, 2 |
| 4 | 1, 2, 4 |
| 8 | 1, 2, 4, 8 |
| 10 | 1, 2, 5, 10 |
| 12 | 1, 2, 3, 6, 12 |
| 14 | 1, 2, 7, 14 |

In some examples, referring to FIGS. 6A, 6B, and 6C, the examples 600, 630, and 660 shows that the sounding BW is 48 PRBs. FIG. 6A illustrates the first example 600 of a frequency hopping pattern for SRS transmission having N=2

TABLE 2

The offset $k_{offset}^{l'}$ for SRS as a function of $K_{TC}$ and l'.

| | | | $k_{offset}^{0}, \ldots, k_{offset}^{N_{symb}^{SRS}-1}$ | | |
|---|---|---|---|---|---|
| $K_{TC}$ | $N_{symb}^{SRS} = 1$ | $N_{symb}^{SRS} = 2$ | $N_{symb}^{SRS} = 4$ | $N_{symb}^{SRS} = 8$ | $N_{symb}^{SRS} = 12$ |
| 2 | 0 | 0, 1 | 0, 1, 0, 1 | — | — |
| 4 | — | 0, 2 | 0, 2, 1, 3 | 0, 2, 1, 3, 0, 2, 1, 3 | 0, 2, 1, 3, 0, 2, 1, 3, 0, 2, 1, 3 |
| 8 | — | — | 0, 4, 2, 6 | 0, 4, 2, 6, 1, 5, 3, 7 | 0, 4, 2, 6, 1, 5, 3, 7, 0, 4, 2, 6 |

In some aspects, $k_{TC}^{(p_i)}$ may be represented as $$\begin{cases} (\bar{k}_{TC} + K_{TC}/2) \mod K_{TC} & \text{if } N_{ap}^{SRS} = 4, p_i \in \{1001, 1003\}, \text{ and } n_{SRS}^{cs,max} = 6 \\ (\bar{k}_{TC} + K_{TC}/2) \mod K_{TC} & \text{if } N_{ap}^{SRS} = 4, p_i \in \{1001, 1003\}, \\ & \text{and } n_{SRS}^{cs} \in \{n_{SRS}^{cs,max}/2, \ldots, n_{SRS}^{cs,max} - 1\} \\ \bar{k}_{TC} & \text{otherwise} \end{cases}$$

In the situation of a multi-port SRS resource, all ports may be configured on the same REs/comb offset. That is, in the and R=1. That is, the number of OFDM symbols (e.g., N) may be 2, and the repetition factor (e.g., R) may be 1. Also, the bandwidth for each hop may be 24 PRBs. FIG. 6B illustrates the second example 630 of a frequency hopping pattern for SRS transmission having N=4 and R=1. That is, the number of OFDM symbols (e.g., N) may be 4, and the repetition factor (e.g., R) may be 1. Also, the bandwidth for each hop may be 12 PRBs. FIG. 6C illustrates the third example 660 of a frequency hopping pattern for SRS transmission having N=4 and R=2. That is, the number of OFDM symbols (e.g., N) may be 4, and the repetition factor (e.g., R) may be 2. Also, the bandwidth for each hop may be 24 PRBs. Because the repetition factor is 2, each frequency hopping may be repeated twice (2).

In some aspects, the wireless communication systems may support UEs configured for SRS transmissions to multiple cells or TRPs (e.g., network nodes). This may result in increased SRS transmissions within a given SRS occasion due to a large number of UE performing SRS transmission to different cells/TRPs. That is, coherence joint transmission (CJT) across multiple TRPs may be supported where different UE are configured for SRS transmissions across different SRS Tx occasions. This may result in multiple TRPs receiving the SRS transmission from a given UE. In case a large number of UEs are configured for SRS transmissions, multiple UEs may end up performing the SRS transmissions during the same OFDM symbol. To properly transmit and receive the SRS transmissions by multiple UEs during the same OFDM symbol, interference randomization may be provided to avoid or mitigate inter-cluster interference. For example, the interference randomization mechanism may include group hopping, sequence hopping (e.g., in the SRS base sequence domain), or cyclic shift hopping.

Based on the staggered SRS (e.g., the offset $k_{offset}^{l'}$ for SRS as a function of $K_{TC}$ and l' from Table 2), the UE may avoid or mitigate some inter-cluster interference. That is, with the staggered SRS configuration, different symbols of a given SRS resource may already have different comb offsets to avoid or mitigate inter-cluster interference. However, as the comb offset pattern may be fixed (e.g., the Table 2) and not pseudo-random, and multiple UEs may result in sounding within a group of consecutive OFDM symbols (or a subset if consecutive OFDM symbols), two or more comb offsets are sounded uniformly. Therefore, the staggered SRS configuration may not be sufficient for the CJT across multiple TRPs.

In one aspect, a comb offset hopping may be provided as an example of the interference randomization mechanism. The comb offset hopping may include comb offset (e.g., according to a comb offset hopping formula) determined based on a pseudo-random sequence with a certain initialization and as a function of time (e.g., a slot number or a symbol number). In one example, the unit of such determination may be configured per symbol (e.g., comb offset is pseudo-randomly determined per SRS symbol) or may be configured per SRS resource (e.g., the pseudo-random determination does not change within one instance of SRS resource with N symbols, but can change in different instances of the SRS resource). The pseudo-random sequence may be associated with various parameters, including a slot number within a radio frame or a symbol number within a slot.

In some aspects, the pseudo-random comb offset hopping may be configured for the SRS for positioning to maintain certain property of the staggered SRS (e.g., the offset $k_{offset}^{l'}$ for SRS as a function of $K_{TC}$ and l' from Table 2). For example, with comb spacing 8 and N=8 OFDM symbols, the hopping pattern may be 0, 4, 2, 6, 1, 5, 3, 7 (e.g., Table 2). In one example, the eight (8) OFDM symbols may be considered as one group, and all comb offsets may be sounded. In another example, four (4) symbols may be considered as one group, and the eight (8) OFDM symbols may be divided in to two (2) groups (e.g., { 0, 4, 2, 6} or {1, 5, 3, 7 }), each group including four (4) uniformly spaced comb offsets that may be sounded within each group. In another example, two (2) symbols may be considered as one group, and the eight (8) OFDM symbols may be divided in to four (4) groups (e.g., {0, 4}, {2, 6}, { 1, 5}, or {3, 7}), each group including two (2) uniformly spaced comb offsets being sounded within each group.

In one aspect, in the case of applying time domain orthogonal cover codes (TD-OCC) sequence, a set of OFDM symbols on which TD-OCC sequence is applied may have the same comb offset. In another aspect, when repetition factor is greater than one (1) (e.g., R>1), the set of OFDM symbols with repeated SRS may have the same comb offset.

In some aspects, an SRS resource may be configured by a higher layer parameter (e.g., SRS-PosResource configuring the SRS for positioning), and a pseudo-random comb offset hopping may be configured. Here, the unit of hopping may be per group of X consecutive OFDM symbols of the SRS resource, where X may be at least a function of comb spacing (e.g., 2, 4, 8) and a number of OFDM symbols of the SRS resource (e.g., N). Here, the hopping formula may decide (e.g., pseudo-randomly) a comb offset value common to all symbols of the group of X consecutive symbols. That is, when the network node configures the UE with a SRS for positioning with the pseudo-random comb offset hopping, the UE and the network may apply the same comb offset value for each group of consecutive OFDM symbols of the SRS resources.

In some aspects, the hopping formula may be configured as a function of the slot number within a frame and the symbol number within a slot of the first symbol of the group of X consecutive symbols. That is, different comb offset hopping based on the pseudo-random number may be applied per group of X consecutive symbols, and within the group of X consecutive symbols, the same comb offset pattern may be applied relative to the common comb offset value, where the comb offset pattern may maintain certain property of the staggered SRS comb pattern with uniformly spaced comb offsets.

In one aspect, for each symbol, a corresponding SRS comb offset value in the SRS hopping pattern may depend on the symbol number within the SRS resource. That is, the SRS hopping pattern may be based on the SRS comb pattern based on a configured pattern (e.g., the Table 2), and the SRS comb pattern may not be the same for two different groups of X consecutive symbols. For example, the number of OFDM symbols may be configured as N=2*X=8 with the comb spacing (e.g., $K_{TC}$) 8, the eight (8) OFDM symbols may be divided into two groups of four (4) consecutive OFDM symbols. The first group of four (4) OFDM symbols may be associated with the offset pattern of (0, 4, 2, 6), and in the second group of four (4) OFDM symbols may be associated with the offset pattern of (1, 5, 3, 7).

In another aspect, for each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. For example, the number of OFDM symbols may be configured as N=2* X=8 with the comb spacing (e.g., $K_{TC}$) 8, the eight (8) OFDM symbols may be divided into two groups of four (4) consecutive OFDM symbols. The SRS comb pattern may be associated with the offset pattern of (0, 4, 2, 6) for each group of the four (4) consecutive OFDM symbols.

For example, the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^\mu, l_0)) \mod K_{TC}$. Here, $k_{TC}^{(p_i)}$ may be determined based on (existing) RRC configured CombOffset($\bar{K}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}(n_s, f^\mu, l_0)$ may be a comb offset hopping formula for determining a comb offset value common to all symbols of the group of X consecutive symbols, where $n_{s,f}^\mu$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

According to some aspects, the comb offset value configured in common for the X consecutive OFDM symbols of each group may be separately determined per each group, and therefore, there may be no difference in practice between the first aspect of determining the SRS hopping pattern based on a configured SRS comb pattern (e.g., the Table 2), and the second aspect of determining the SRS hopping pattern based on the SRS comb pattern, which may be determined based on $k_{offset}^{l'}$.

In some aspects, the number of symbols in the group of consecutive symbols may be determined as a function of a comb spacing (e.g., $K_{TC}$=2, 4, 8) and the number of OFDM symbols of the SRS resource (e.g., N).

In one aspect, the number of symbols in the group of consecutive symbols may be configured equal to the minimum of comb spacing and N. Accordingly, with the group of X consecutive symbols, all comb offsets may be sounded. Table 4 illustrates examples of the number of symbols (e.g., X) in the group of consecutive symbols.

TABLE 4

$K_{TC}$, N, and number of symbols (e.g., X) in group of consecutive symbols

| Comb spacing ($K_{TC}$) | N = 1 | N = 2 | N = 4 | N = 8 | N = 12 |
|---|---|---|---|---|---|
| 2 | X = 1 | X = 2 | X = 2 | — | — |
| 4 | — | X = 2 | X = 4 | X = 4 | X = 4 |
| 8 | — | — | X = 4 | X = 8 | X = 8 followed by another X = 4 |

In case of the comb spacing of 8 (e.g., $K_{TC}$=8) and the number of OFDM symbols being 12 (e.g., N=12), the number of symbols in the group of consecutive symbols may be determined as eight (8), and the first group of symbols may include eight (8) symbols and the second group of symbols may include the remaining four (4) symbols.

In another aspect, the number of symbols (e.g., X) in the group of consecutive symbols may be configured such that the comb spacing (e.g., $K_{TC}$) divided by X is an integer number, so that with a group of X symbols, a subset of comb offsets may be uniformly sounded. The case of X=N when N is larger than comb spacing may or may not be a possible choice. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). Accordingly, multiple number of symbols (e.g., X) in the group of consecutive symbols may be available as provided in Table 5. The UE may select one number of symbols (e.g., X) in the group of consecutive symbols from the available set of numbers. In one example, the number of symbols (e.g., X) may be received from the network node as an RRC message. In another example, a default configuration of the number of symbols (e.g., X) in the group of consecutive symbols may be provided for the UE and the network node. Here, the underlined number of X may larger than the comb spacing (e.g., $K_{TC}$), and may not be applicable.

TABLE 5

$K_{TC}$, N, and number of symbols (e.g., X) in group of consecutive symbols

| Comb spacing ($K_{TC}$) | N = 1 | N = 2 | N = 4 | N = 8 | N = 12 |
|---|---|---|---|---|---|
| 2 | X = 1 | X = 1, 2 | X = 1, 2, 4 | — | — |
| 4 | — | X = 1, 2 | X = 1, 2, $\overline{4}$ | X = 1, 2, 4, 8 | X = 1, 2, 4, <u>12</u> |
| 8 | — | — | X = 1, 2, 4 | X = $\overline{1}$, 2, 4, 8 | X = $\overline{1}$, 2, 4, 8, <u>12</u> |

Figure 7B:
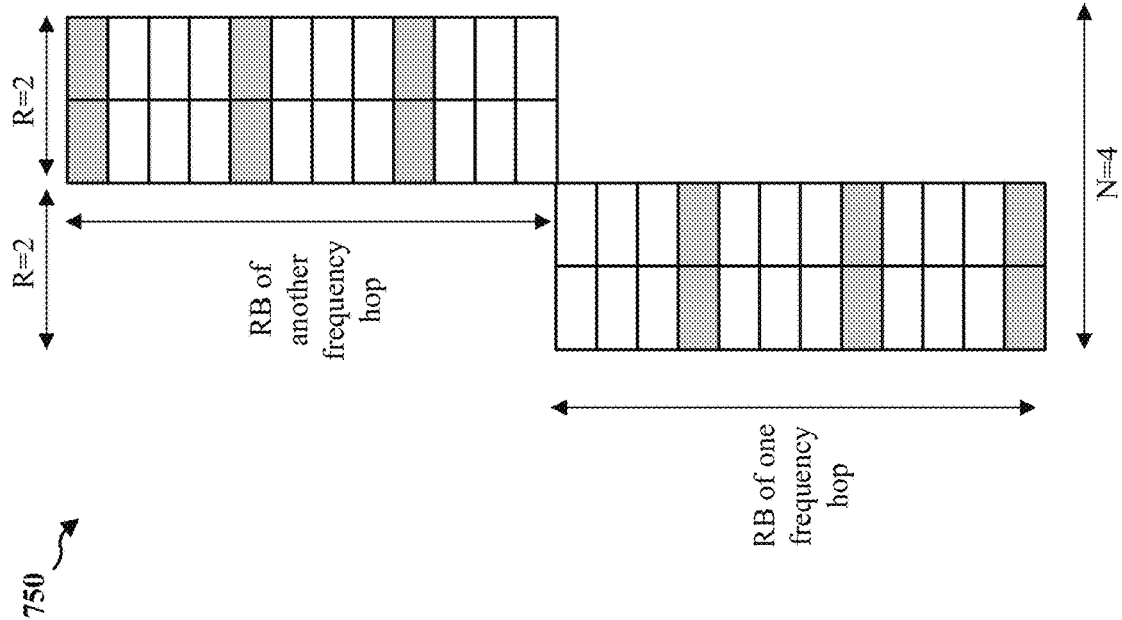
FIGS. 7A and 7B are examples of comb offset hopping patterns configured for a subset of symbols.
Figure 7A:
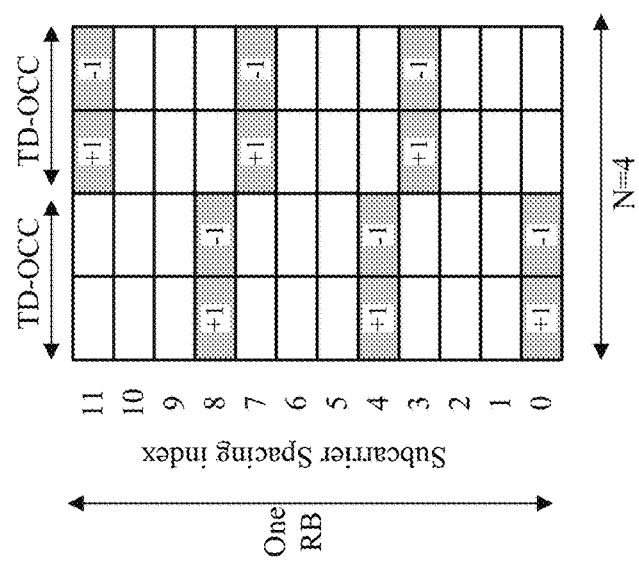

FIGS. 7A and 7B are examples 700 and 750 of comb offset hopping patterns configured for a subset of symbols. FIG. 7A illustrates a first example 700 including a time domain orthogonal cover codes (TD-OCC). An SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

The first example 700 shows that the comb spacing may be 4 (e.g., $K_{TC}$=4), the number of OFDM symbols may be four (e.g., N=4), and Y may be two (2) (e.g., TD-OCC length is 2 applied over 2 symbols). The hopping formula may determine a comb offset of zero (0) for the first 2 symbols and a comb offset of three (3) for the next 2 symbols. According to the current implementation, the same comb offset may be maintained within the 2 symbols over which TD-OCC is applied.

FIG. 7B illustrates a second example 750 including a repetition factor (e.g., R). An SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

The second example 750 shows that the comb spacing may be 4 (e.g., $K_{TC}$=4), the number of OFDM symbols may be four (e.g., N=4), and R may be two (2) (e.g., two frequency hops each with 2 symbols). The hopping formula may determine a comb offset of zero (0) for the first 2 symbols and a comb offset of three (3) for the next 2 symbols. According to the current implementation, the same comb offset may be maintained within the 2 symbols over which TD-OCC is applied.

Figure 8:
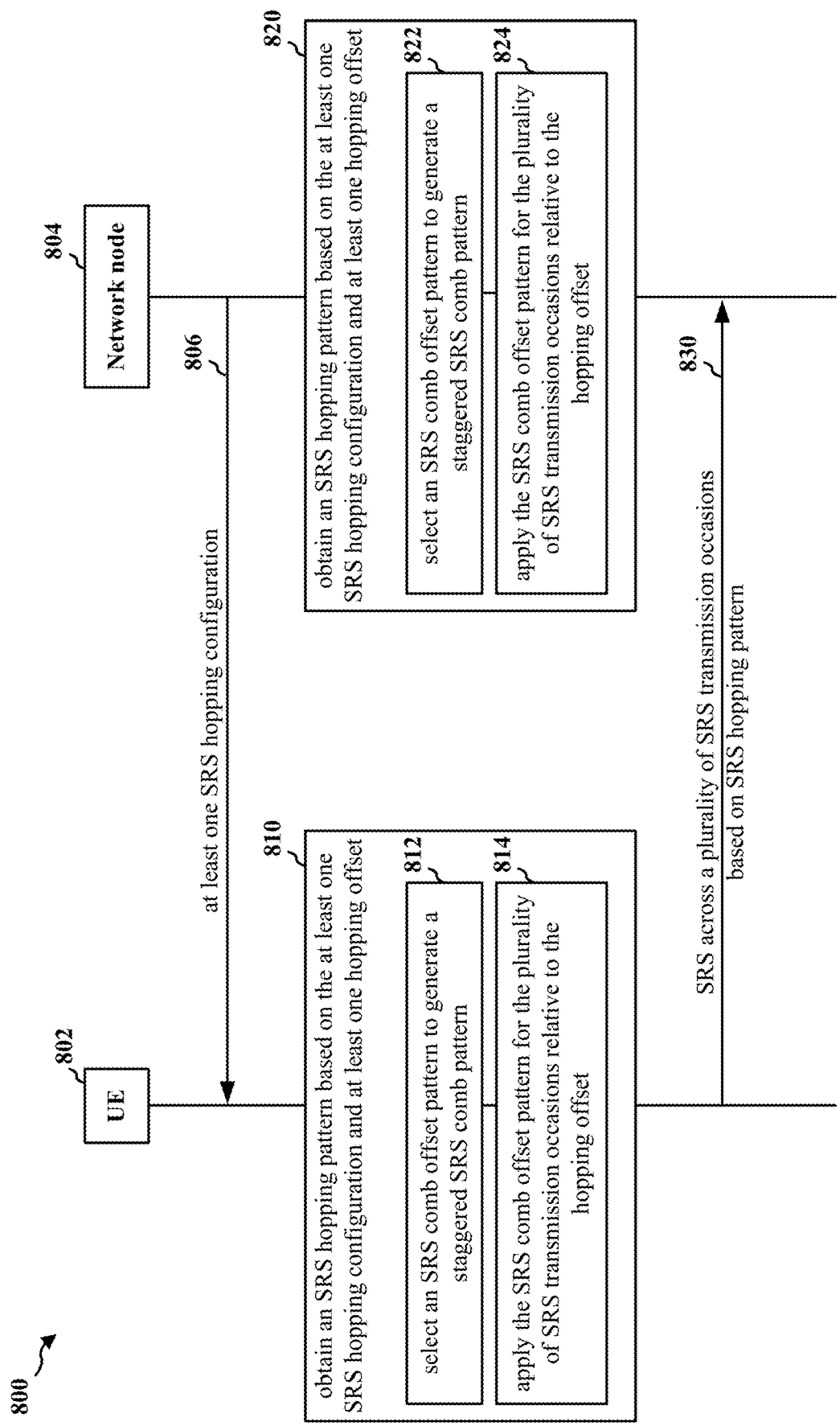
FIG. 8 is a call-flow diagram of a method of wireless communication.

FIG. 8 is a call-flow diagram 800 of a method of wireless communication. The call-flow diagram 800 may include a UE 802 and a network node 804. The network node 804 may configure the UE 802 with at least one SRS hopping configuration associated with an SRS hopping pattern, and the UE 802 and the network node 804 may obtain the SRS hopping pattern based on the at least one SRS hopping configuration and at least one hopping offset. Here, the SRS hopping pattern may include one or more subsets of hopping patterns and each subset of hopping patterns including a subset of consecutive SRS transmission occasions may be associated with the same hopping offset. Accordingly, the SRS hopping pattern may be configured to provide randomization while maintaining certain property of the staggered SRS comb pattern with uniformly spaced comb offsets, so that increased number of REs may be sounded uniformly.

At 806, the network node 804 may transmit at least one SRS hopping configuration for a UE 802. The UE 802 may receive at least one SRS hopping configuration from a network node 804. The at least one SRS hopping configuration may include at least one of a comb spacing number and/or a number of the plurality of SRS transmission occasions. Here, the number of the plurality of SRS transmission occasions represents how many SRS transmission occasions are configured.

At 810, the UE 802 may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. Here, 810 may include 812 and 814.

In one aspect, a number of SRS transmission occasions in the subset of consecutive SRS transmission occasions may be based on at least one of the comb spacing number or the number of the plurality of SRS transmission occasions received at 806. Here, the number of SRS transmission occasions represent how many SRS transmission occasions are included in each subset of consecutive SRS transmission occasions. For each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^\mu, l_0))$ mod $K_{TC}$. Here, $k_{TC}^{(p_i)}$ may be determined based on (existing) RRC configured CombOffset($\bar{k}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}(n_{s,f}^\mu, l_0)$ may be a comb offset hopping formula for determining a comb offset value common to all symbols of the group of X consecutive symbols, where $n_{s,f}^\mu$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

First, the number of SRS transmission occasions in the subset of consecutive SRS transmission occasions may be equal to a minimum of the comb spacing number and the number of the plurality of SRS transmission occasions. That is, the number of symbols in the group of consecutive symbols may be configured equal to the minimum of comb spacing and N. Accordingly, with the group of X consecutive symbols, all comb offsets may be sounded.

Second, the number of SRS transmission occasions in the subset of consecutive SRS transmission occasions may be the number of the plurality of SRS transmission occasions or a divisor of the number of the plurality of SRS transmission occasions that is not greater than the comb spacing number. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). The case of X=N when N is larger than comb spacing (e.g., $K_{TC}$) may or may not be applicable.

In one example, a default number of SRS transmission occasions in the subset of consecutive SRS transmission occasions may be configured for the UE 802. That is, the UE 802 and the network node 804 may be configured with a default number of SRS transmission occasions in the subset of consecutive SRS transmission occasions for each possible combination. In another example, the number of SRS transmission occasions in the subset of consecutive SRS transmission occasions may be received from the network node 804 at 806 via the RRC message.

In another aspect, the SRS hopping pattern may be based at least in part on a slot number of the plurality of SRS transmission occasions within a radio frame and a symbol number of a first symbol of the subset of consecutive SRS transmission occasions within a slot In one example, the plurality of SRS transmission occasions may be configured to apply a TD-OCC across the subset of consecutive SRS transmission occasions. The SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

In another example, the plurality of SRS transmission occasions may be configured to apply a repetition of SRS across the subset of consecutive SRS transmission occasions. The SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

At 812, the UE 802 may select an SRS comb offset pattern for the plurality of SRS transmission occasions based on the at least one SRS hopping configuration.

At 814, the UE 802 may apply the SRS comb offset pattern for the plurality of SRS transmission occasions relative to the hopping offset associated with one or more subsets of hopping patterns.

The SRS comb offset pattern for the plurality of SRS transmission occasions may be selected based on the comb spacing number and the number of the plurality of SRS transmission occasions received at 806. In one aspect, the hopping offset of the plurality of SRS hopping pattern for each SRS transmission occasion is based at least in part on a symbol number of each SRS transmission occasion within the plurality of SRS transmission occasions. In another aspect, the hopping offset of the plurality of SRS hopping pattern for each SRS transmission occasion is based at least in part on a symbol number of each SRS transmission occasion within the subset of consecutive SRS transmission occasions. In one example, the same hopping offset may be associated with one or more subsets of hopping patterns. In another example, different hopping offsets may be associated with one or more subsets of hopping patterns.

At 820, the network node 804 may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. Here, 820 may include 822 and 824.

In one aspect, a number of SRS transmission occasions in the subset of consecutive SRS transmission occasions may be based on at least one of the comb spacing number or the number of the plurality of SRS transmission occasions transmitted at 806. For each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^{\mu}, l_0))$ mod $K_{TC}$. Here, $k_{TC}^{(p_i)}$ may be determined based on (existing) RRC configured CombOffset($\bar{k}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}(n_{s,f}^{\mu}, l_0)$ may be a comb offset hopping formula for determining a comb offset value common to all symbols of the group of X consecutive symbols, where $n_{s,f}^{\mu}$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

First, the number of SRS transmission occasions in the subset of consecutive SRS transmission occasions may be equal to a minimum of the comb spacing number and the number of the plurality of SRS transmission occasions. That is, the number of symbols in the group of consecutive symbols may be configured equal to the minimum of comb spacing and N. Accordingly, with the group of X consecutive symbols, all comb offsets may be sounded.

Second, the number of SRS transmission occasions in the subset of consecutive SRS transmission occasions may be the number of the plurality of SRS transmission occasions or a divisor of the number of the plurality of SRS transmission occasions that is not greater than the comb spacing number. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). The case of X=N when N is larger than comb spacing (e.g., $K_{TC}$) may or may not be applicable.

In one example, a default number of SRS transmission occasions in the subset of consecutive SRS transmission occasions may be configured for the UE 802. That is, the UE 802 and the network node 804 may be configured with a default number of SRS transmission occasions in the subset of consecutive SRS transmission occasions for each possible combination. In another example, the number of SRS transmission occasions in the subset of consecutive SRS transmission occasions may be transmitted for the UE 802 at 806 via the RRC message.

In another aspect, the SRS hopping pattern may be based at least in part on a slot number of the plurality of SRS transmission occasions within a radio frame and a symbol number of a first symbol of the subset of consecutive SRS transmission occasions within a slot In one example, the plurality of SRS transmission occasions may be configured to apply a TD-OCC across the subset of consecutive SRS transmission occasions. The SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

In another example, the plurality of SRS transmission occasions may be configured to apply a repetition of SRS across the subset of consecutive SRS transmission occasions. The SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

At 822, the network node 804 may select an SRS comb offset pattern for the plurality of SRS transmission occasions based on the at least one SRS hopping configuration.

At 824, the network node 804 may apply the SRS comb offset pattern for the plurality of SRS transmission occasions relative to the hopping offset associated with one or more subsets of hopping patterns.

The SRS comb offset pattern for the plurality of SRS transmission occasions may be selected based on the comb spacing number and the number of the plurality of SRS transmission occasions transmitted at 806. In one aspect, the hopping offset of the plurality of SRS hopping pattern for each SRS transmission occasion is based at least in part on a symbol number of each SRS transmission occasion within the plurality of SRS transmission occasions. In another aspect, the hopping offset of the plurality of SRS hopping pattern for each SRS transmission occasion is based at least in part on a symbol number of each SRS transmission occasion within the subset of consecutive SRS transmission occasions. In one example, the same hopping offset may be associated with one or more subsets of hopping patterns. In another example, different hopping offsets may be associated with one or more subsets of hopping patterns.

At 830, the UE 802 may transmit a set of SRS across a plurality of SRS transmission occasions based on the SRS hopping pattern. The network node 804 may obtain a set of SRS across a plurality of SRS transmission occasions based on the SRS hopping pattern. The SRS hopping pattern may provide randomization while maintaining certain property of the staggered SRS comb pattern with uniformly spaced comb offsets, so that increased number of REs may be sounded uniformly.

Figure 9:
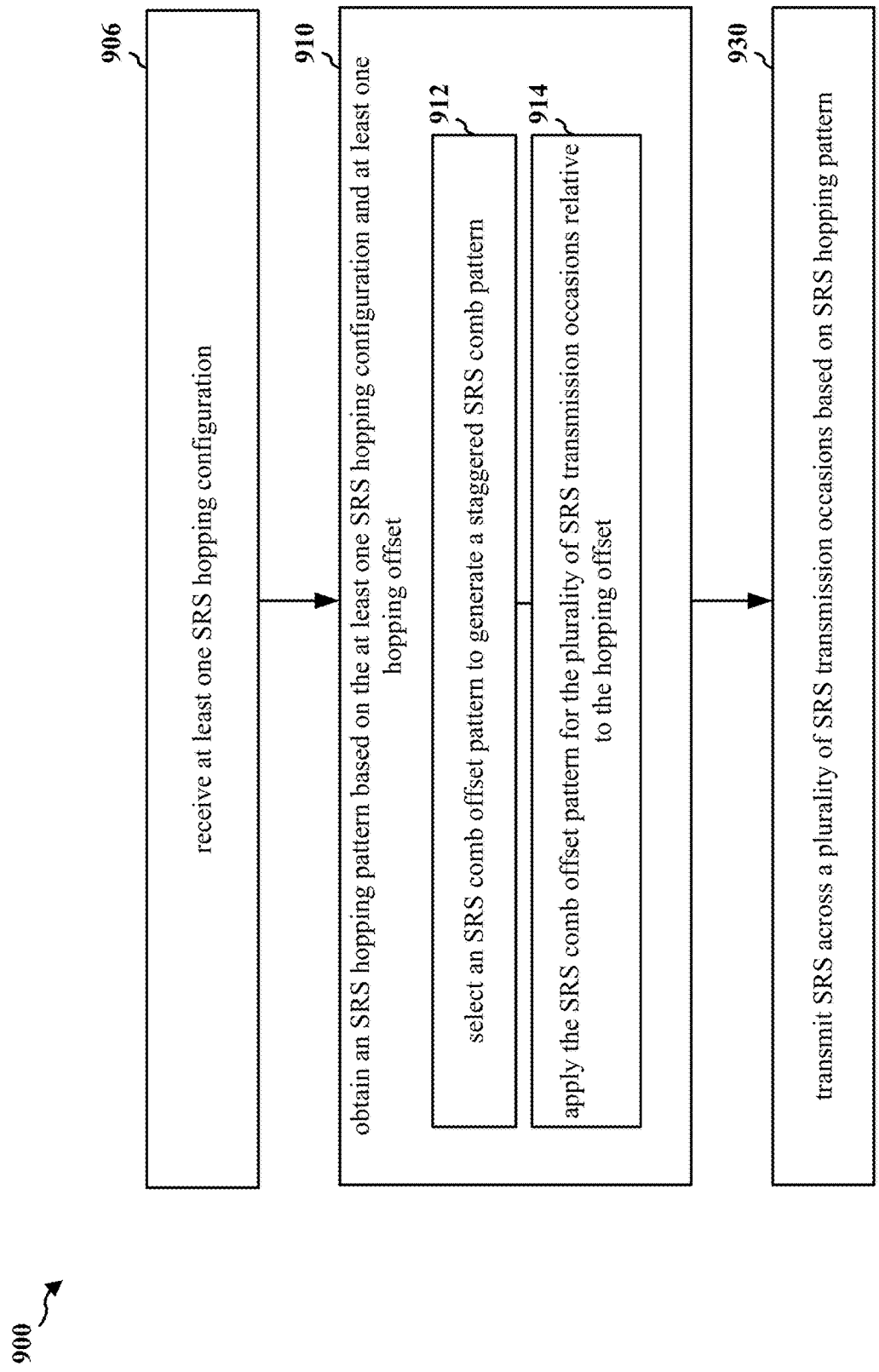
FIG. 9 is a flowchart of a method of wireless communication.

FIG. 9 is a flowchart 900 of a method of wireless communication. The method may be performed by a UE (e.g., the UE 104/404/902; the apparatus 1304). The UE may receive at least one SRS hopping configuration associated with an SRS hopping pattern from a network node and may obtain the SRS hopping pattern based on the at least one SRS hopping configuration and at least one hopping offset. Here, the SRS hopping pattern may include one or more subsets of hopping patterns and each subset of hopping patterns including a subset of consecutive SRS transmission occasions may be associated with the same hopping offset. Accordingly, the SRS hopping pattern may be configured to provide randomization while maintaining certain property of the staggered SRS comb pattern with uniformly spaced comb offsets, so that increased number of REs may be sounded uniformly.

At 906, the UE may receive at least one SRS hopping configuration from a network node. The at least one SRS hopping configuration may include at least one of a comb spacing number and/or a number of the plurality of SRS transmission occasions. Here, the number of the plurality of SRS transmission occasions represents how many SRS transmission occasions are configured. For example, at 806, the UE 802 may receive at least one SRS hopping configuration from a network node 804. Furthermore, 906 may be performed by a SRS hopping configuration component 198.

At 910, the UE may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. For example, at 810, the UE 802 may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. Furthermore, 910 may be performed by the SRS hopping configuration component 198. Here, 910 may include 912 and 914.

In one aspect, a number of SRS transmission occasions in the subset of consecutive SRS transmission occasions may be based on at least one of the comb spacing number or the number of the plurality of SRS transmission occasions received at 906. Here, the number of SRS transmission occasions represent how many SRS transmission occasions are included in each subset of consecutive SRS transmission occasions. For each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^{\mu}, l_0))$ mod $K_{TC}$. Here, $k_{TC}^{(p_i)}$ may be determined based on (existing) RRC configured CombOffset($\bar{k}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}(n_{s,f}^{\mu}, l_0)$ may be a comb offset hopping formula for determining a comb offset value common to all symbols of the group of X consecutive symbols, where $n_{s,f}^{\mu}$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

First, the number of SRS transmission occasions in the subset of consecutive SRS transmission occasions may be equal to a minimum of the comb spacing number and the number of the plurality of SRS transmission occasions. That is, the number of symbols in the group of consecutive symbols may be configured equal to the minimum of comb spacing and N. Accordingly, with the group of X consecutive symbols, all comb offsets may be sounded.

Second, the number of SRS transmission occasions in the subset of consecutive SRS transmission occasions may be the number of the plurality of SRS transmission occasions or a divisor of the number of the plurality of SRS transmission occasions that is not greater than the comb spacing number. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). The case of X=N when N is larger than comb spacing (e.g., $K_{TC}$) may or may not be applicable.

In one example, a default number of SRS transmission occasions in the subset of consecutive SRS transmission occasions may be configured for the UE. That is, the UE and the network node may be configured with a default number of SRS transmission occasions in the subset of consecutive SRS transmission occasions for each possible combination. In another example, the number of SRS transmission occasions in the subset of consecutive SRS transmission occasions may be received from the network node at 906 via the RRC message.

In another aspect, the SRS hopping pattern may be based at least in part on a slot number of the plurality of SRS transmission occasions within a radio frame and a symbol number of a first symbol of the subset of consecutive SRS transmission occasions within a slot In one example, the plurality of SRS transmission occasions may be configured to apply a TD-OCC across the subset of consecutive SRS transmission occasions. The SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

In another example, the plurality of SRS transmission occasions may be configured to apply a repetition of SRS across the subset of consecutive SRS transmission occasions. The SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

At 912, the UE may select an SRS comb offset pattern for the plurality of SRS transmission occasions based on the at least one SRS hopping configuration. For example, at 812, the UE 802 may select an SRS comb offset pattern for the plurality of SRS transmission occasions based on the at least one SRS hopping configuration. Furthermore, 912 may be performed by the SRS hopping configuration component 198.

At 914, the UE may apply the SRS comb offset pattern for the plurality of SRS transmission occasions relative to the hopping offset associated with one or more subsets of hopping patterns. For example, at 814, the UE 802 may apply the SRS comb offset pattern for the plurality of SRS transmission occasions relative to the hopping offset associated with one or more subsets of hopping patterns. Furthermore, 914 may be performed by the SRS hopping configuration component 198.

The SRS comb offset pattern for the plurality of SRS transmission occasions may be selected based on the comb spacing number and the number of the plurality of SRS transmission occasions received at 906. In one aspect, the hopping offset of the plurality of SRS hopping pattern for each SRS transmission occasion is based at least in part on a symbol number of each SRS transmission occasion within the plurality of SRS transmission occasions. In another aspect, the hopping offset of the plurality of SRS hopping pattern for each SRS transmission occasion is based at least in part on a symbol number of each SRS transmission occasion within the subset of consecutive SRS transmission occasions. In one example, the same hopping offset may be associated with one or more subsets of hopping patterns. In another example, different hopping offsets may be associated with one or more subsets of hopping patterns.

At 930, the UE may transmit a set of SRS across a plurality of SRS transmission occasions based on the SRS hopping pattern. The SRS hopping pattern may provide randomization while maintaining certain property of the staggered SRS comb pattern with uniformly spaced comb offsets, so that increased number of REs may be sounded uniformly. For example, at 830, the UE 802 may transmit a set of SRS across a plurality of SRS transmission occasions based on the SRS hopping pattern. Furthermore, 930 may be performed by the SRS hopping configuration component 198.

Figure 10:
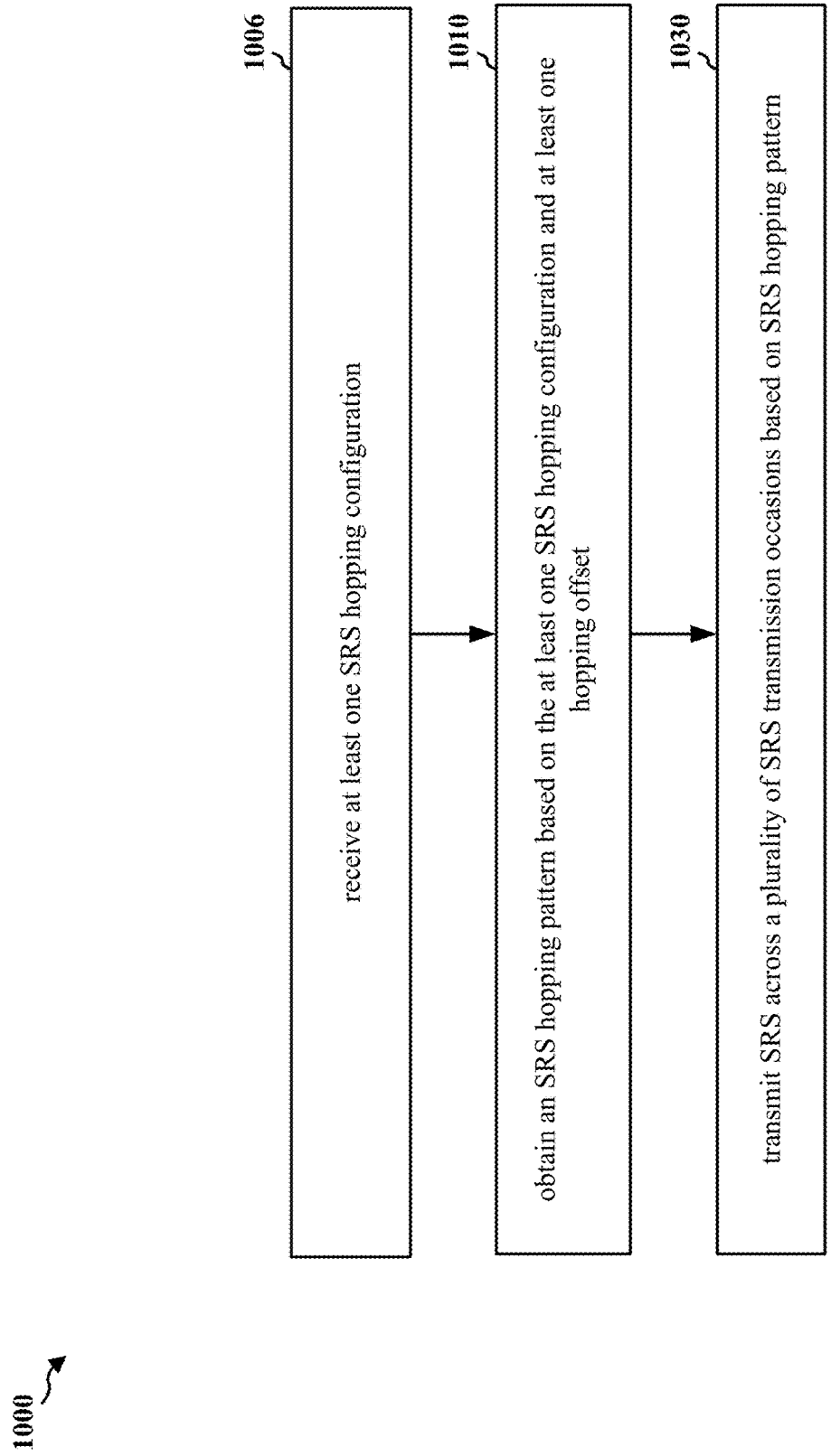
FIG. 10 is a flowchart of a method of wireless communication.

FIG. 10 is a flowchart 1000 of a method of wireless communication. The method may be performed by a UE (e.g., the UE 104/404/902; the apparatus 1304). The UE may receive at least one SRS hopping configuration associated with an SRS hopping pattern from a network node and may obtain the SRS hopping pattern based on the at least one SRS hopping configuration and at least one hopping offset. Here, the SRS hopping pattern may include one or more subsets of hopping patterns and each subset of hopping patterns including a subset of consecutive SRS transmission occasions may be associated with the same hopping offset. Accordingly, the SRS hopping pattern may be configured to provide randomization while maintaining certain property of the staggered SRS comb pattern with uniformly spaced comb offsets, so that increased number of REs may be sounded uniformly.

At 1006, the UE may receive at least one SRS hopping configuration from a network node. The at least one SRS hopping configuration may include at least one of a comb spacing number and/or a number of the plurality of SRS transmission occasions. Here, the number of the plurality of SRS transmission occasions represents how many SRS transmission occasions are configured. For example, at 806, the UE 802 may receive at least one SRS hopping configuration from a network node 804. Furthermore, 1006 may be performed by a SRS hopping configuration component 198.

At 1010, the UE may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. For example, at 810, the UE 802 may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. Furthermore, 1010 may be performed by the SRS hopping configuration component 198. Here, 1010 may include 1012 and 1014.

In one aspect, a number of SRS transmission occasions in the subset of consecutive SRS transmission occasions may be based on at least one of the comb spacing number or the number of the plurality of SRS transmission occasions received at 1006. Here, the number of SRS transmission occasions represent how many SRS transmission occasions are included in each subset of consecutive SRS transmission occasions. For each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^\mu, l_0))$ mod $K_{TC}$. Here, $k_{TC}^{(p_i)}$ may be determined based on (existing) RRC configured CombOffset($\bar{k}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}$ ($n_{s,f}^\mu$, $l_0$)may be a comb offset hopping formula for determining a comb offset value common to all symbols of the group of X consecutive symbols, where $n_{s,f}^\mu$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

First, the number of SRS transmission occasions in the subset of consecutive SRS transmission occasions may be equal to a minimum of the comb spacing number and the number of the plurality of SRS transmission occasions. That is, the number of symbols in the group of consecutive symbols may be configured equal to the minimum of comb spacing and N. Accordingly, with the group of X consecutive symbols, all comb offsets may be sounded.

Second, the number of SRS transmission occasions in the subset of consecutive SRS transmission occasions may be the number of the plurality of SRS transmission occasions or a divisor of the number of the plurality of SRS transmission occasions that is not greater than the comb spacing number. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). The case of X=N when N is larger than comb spacing (e.g., $K_{TC}$) may or may not be applicable.

In one example, a default number of SRS transmission occasions in the subset of consecutive SRS transmission occasions may be configured for the UE. That is, the UE and the network node may be configured with a default number of SRS transmission occasions in the subset of consecutive SRS transmission occasions for each possible combination. In another example, the number of SRS transmission occasions in the subset of consecutive SRS transmission occasions may be received from the network node at 1006 via the RRC message.

In another aspect, the SRS hopping pattern may be based at least in part on a slot number of the plurality of SRS transmission occasions within a radio frame and a symbol number of a first symbol of the subset of consecutive SRS transmission occasions within a slot In one example, the plurality of SRS transmission occasions may be configured to apply a TD-OCC across the subset of consecutive SRS transmission occasions. The SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

In another example, the plurality of SRS transmission occasions may be configured to apply a repetition of SRS across the subset of consecutive SRS transmission occasions. The SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

The SRS comb offset pattern for the plurality of SRS transmission occasions may be selected based on the comb spacing number and the number of the plurality of SRS transmission occasions received at 1006. In one aspect, the hopping offset of the plurality of SRS hopping pattern for each SRS transmission occasion is based at least in part on a symbol number of each SRS transmission occasion within the plurality of SRS transmission occasions. In another aspect, the hopping offset of the plurality of SRS hopping pattern for each SRS transmission occasion is based at least in part on a symbol number of each SRS transmission occasion within the subset of consecutive SRS transmission occasions. In one example, the same hopping offset may be associated with one or more subsets of hopping patterns. In another example, different hopping offsets may be associated with one or more subsets of hopping patterns.

At 1030, the UE may transmit a set of SRS across a plurality of SRS transmission occasions based on the SRS hopping pattern. The SRS hopping pattern may provide randomization while maintaining certain property of the staggered SRS comb pattern with uniformly spaced comb offsets, so that increased number of REs may be sounded uniformly. For example, at 830, the UE 802 may transmit a set of SRS across a plurality of SRS transmission occasions based on the SRS hopping pattern. Furthermore, 1030 may be performed by the SRS hopping configuration component 198.

Figure 11:
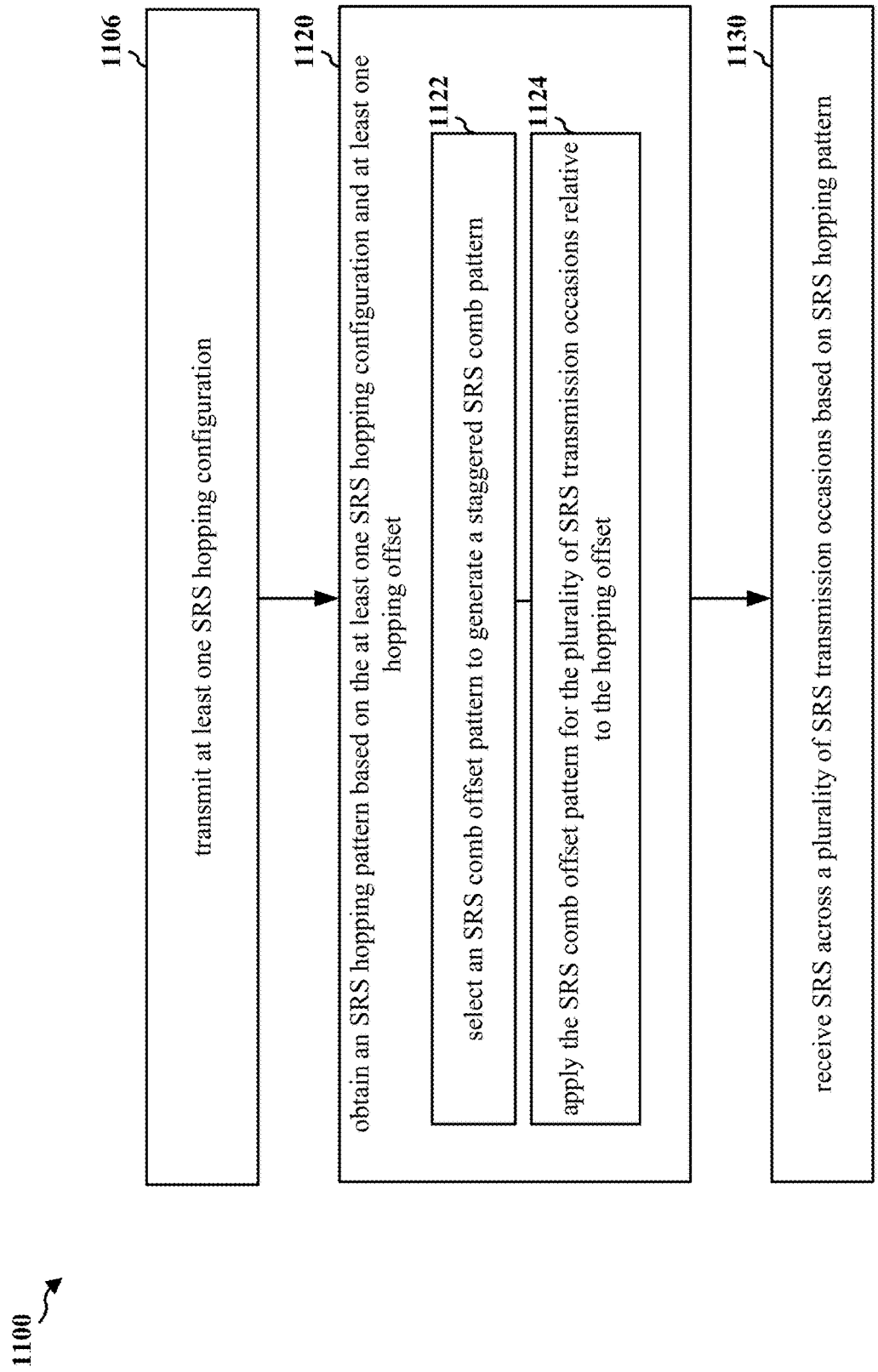
FIG. 11 is a flowchart of a method of wireless communication.

FIG. 11 is a flowchart 1100 of a method of wireless communication. The method may be performed by a network node (e.g., the base station 102; the TRP 406; the network node 804; the network entity 1402/1660). The network node may configure the UE with at least one SRS hopping configuration associated with an SRS hopping pattern, and obtain the SRS hopping pattern based on the at least one SRS hopping configuration and at least one hopping offset. Here, the SRS hopping pattern may include one or more subsets of hopping patterns and each subset of hopping patterns including a subset of consecutive SRS transmission occasions may be associated with the same hopping offset. Accordingly, the SRS hopping pattern may be configured to provide randomization while maintaining certain property of the staggered SRS comb pattern with uniformly spaced comb offsets, so that increased number of REs may be sounded uniformly.

At 1106, the network node may transmit at least one SRS hopping configuration for a UE 802. The at least one SRS hopping configuration may include at least one of a comb spacing number and/or a number of the plurality of SRS transmission occasions. Here, the number of the plurality of SRS transmission occasions represents how many SRS transmission occasions are configured. For example, at 806, the network node 804 may transmit at least one SRS hopping configuration for a UE 802. Furthermore, 1106 may be performed by a SRS hopping configuring component 199.

At 1120, the network node may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. For example, at 820, the network node 804 may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. Furthermore, 1120 may be performed by the SRS hopping configuring component 199. 1120 may include 1122 and 1124.

In one aspect, a number of SRS transmission occasions in the subset of consecutive SRS transmission occasions may be based on at least one of the comb spacing number or the number of the plurality of SRS transmission occasions received at 1106. Here, the number of SRS transmission occasions represent how many SRS transmission occasions are included in each subset of consecutive SRS transmission occasions. For each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^{\mu}, l_0)) \mod K_{TC}$. Here, $k_{TC}^{(p_i)}$ may be determined based on (existing) RRC configured CombOffset($\bar{k}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}(n_{s,f}^{\mu}, l_0)$ may be a comb offset hopping formula for determining a comb offset value common to all symbols of the group of X consecutive symbols, where $n_{s,f}^{\mu}$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

First, the number of SRS transmission occasions in the subset of consecutive SRS transmission occasions may be equal to a minimum of the comb spacing number and the number of the plurality of SRS transmission occasions. That is, the number of symbols in the group of consecutive symbols may be configured equal to the minimum of comb spacing and N. Accordingly, with the group of X consecutive symbols, all comb offsets may be sounded.

Second, the number of SRS transmission occasions in the subset of consecutive SRS transmission occasions may be the number of the plurality of SRS transmission occasions or a divisor of the number of the plurality of SRS transmission occasions that is not greater than the comb spacing number. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). The case of X=N when N is larger than comb spacing (e.g., $K_{TC}$) may or may not be applicable.

In one example, a default number of SRS transmission occasions in the subset of consecutive SRS transmission occasions may be configured for the UE. That is, the UE and the network node may be configured with a default number of SRS transmission occasions in the subset of consecutive SRS transmission occasions for each possible combination. In another example, the number of SRS transmission occasions in the subset of consecutive SRS transmission occasions may be received from the network node at 1106 via the RRC message.

In another aspect, the SRS hopping pattern may be based at least in part on a slot number of the plurality of SRS transmission occasions within a radio frame and a symbol number of a first symbol of the subset of consecutive SRS transmission occasions within a slot In one example, the plurality of SRS transmission occasions may be configured to apply a TD-OCC across the subset of consecutive SRS transmission occasions. The SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

In another example, the plurality of SRS transmission occasions may be configured to apply a repetition of SRS across the subset of consecutive SRS transmission occasions. The SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

At 1122, the network node may select an SRS comb offset pattern for the plurality of SRS transmission occasions based on the at least one SRS hopping configuration. For example, at 822, the network node 804 may select an SRS comb offset pattern for the plurality of SRS transmission occasions based on the at least one SRS hopping configuration. Furthermore, 1122 may be performed by the SRS hopping configuring component 199.

At 1124, the network node may apply the SRS comb offset pattern for the plurality of SRS transmission occasions relative to the hopping offset associated with one or more subsets of hopping patterns. For example, at 824, the network node 804 may apply the SRS comb offset pattern for the plurality of SRS transmission occasions relative to the hopping offset associated with one or more subsets of hopping patterns. Furthermore, 1124 may be performed by the SRS hopping configuring component 199.

The SRS comb offset pattern for the plurality of SRS transmission occasions may be selected based on the comb spacing number and the number of the plurality of SRS transmission occasions transmitted at 1106. In one aspect, the hopping offset of the plurality of SRS hopping pattern for each SRS transmission occasion is based at least in part on a symbol number of each SRS transmission occasion within the plurality of SRS transmission occasions. In another aspect, the hopping offset of the plurality of SRS hopping pattern for each SRS transmission occasion is based at least in part on a symbol number of each SRS transmission occasion within the subset of consecutive SRS transmission occasions. In one example, the same hopping offset may be associated with one or more subsets of hopping patterns. In another example, different hopping offsets may be associated with one or more subsets of hopping patterns.

At 1130, the network node may obtain a set of SRS across a plurality of SRS transmission occasions based on the SRS hopping pattern. The SRS hopping pattern may provide randomization while maintaining certain property of the staggered SRS comb pattern with uniformly spaced comb offsets, so that increased number of REs may be sounded uniformly. For example, at 830, the network node 804 may obtain a set of SRS across a plurality of SRS transmission occasions based on the SRS hopping pattern. Furthermore, 1130 may be performed by the SRS hopping configuring component 199.

Figure 12:
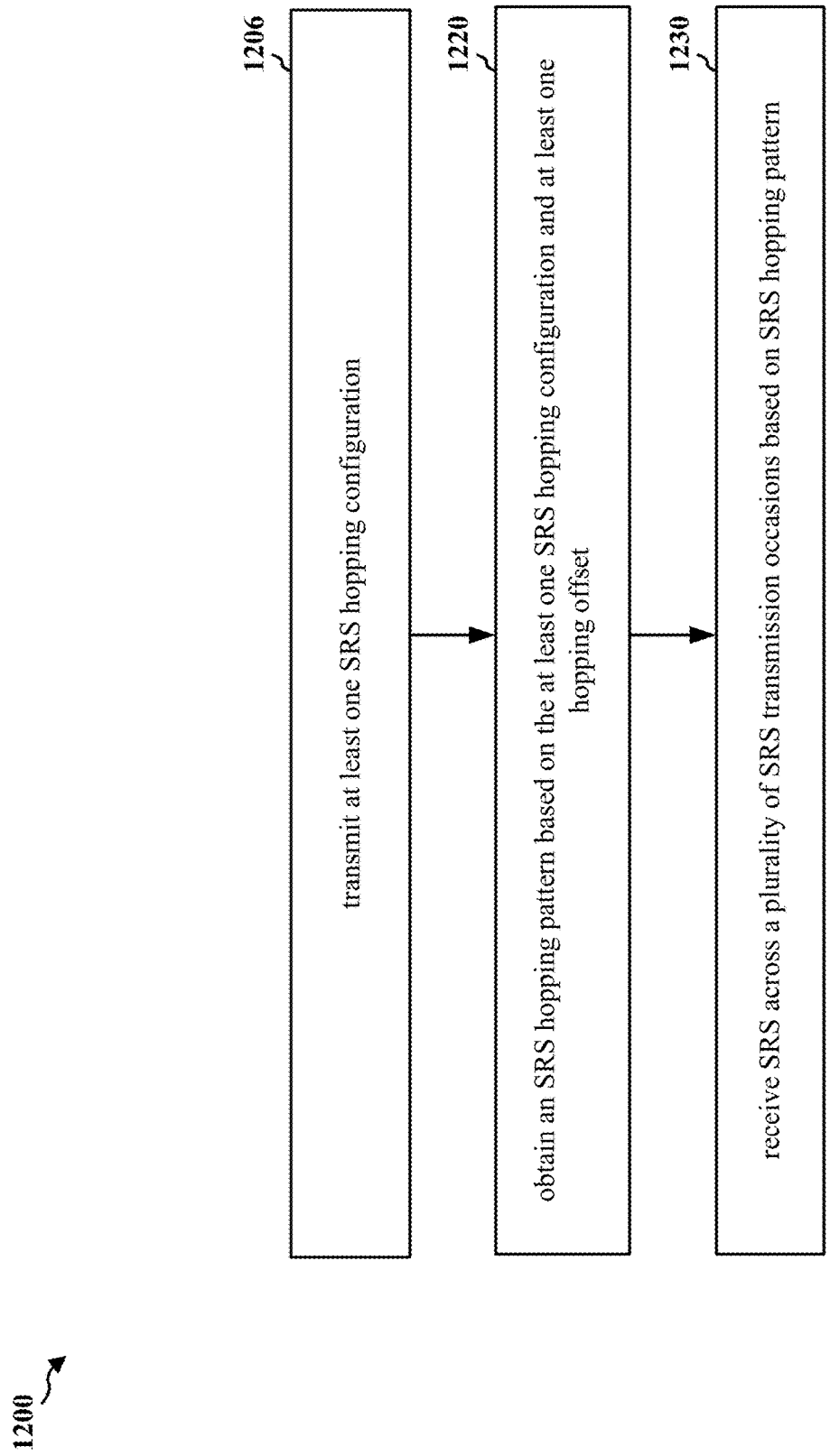
FIG. 12 is a flowchart of a method of wireless communication.

FIG. 12 is a flowchart 1200 of a method of wireless communication. The method may be performed by a network node (e.g., the base station 102; the TRP 406; the network node 804; the network entity 1402/1660). The network node may configure the UE with at least one SRS hopping configuration associated with an SRS hopping pattern, and obtain the SRS hopping pattern based on the at least one SRS hopping configuration and at least one hopping offset. Here, the SRS hopping pattern may include one or more subsets of hopping patterns and each subset of hopping patterns including a subset of consecutive SRS transmission occasions may be associated with the same hopping offset. Accordingly, the SRS hopping pattern may be configured to provide randomization while maintaining certain property of the staggered SRS comb pattern with uniformly spaced comb offsets, so that increased number of REs may be sounded uniformly.

At 1206, the network node may transmit at least one SRS hopping configuration for a UE 802. The at least one SRS hopping configuration may include at least one of a comb spacing number and/or a number of the plurality of SRS transmission occasions. Here, the number of the plurality of SRS transmission occasions represents how many SRS transmission occasions are configured. For example, at 806, the network node 804 may transmit at least one SRS hopping configuration for a UE 802. Furthermore, 1206 may be performed by a SRS hopping configuring component 199.

At 1220, the network node may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. For example, at 820, the network node 804 may obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset. Furthermore, 1220 may be performed by the SRS hopping configuring component 199. 1220 may include 1222 and 1224.

In one aspect, a number of SRS transmission occasions in the subset of consecutive SRS transmission occasions may be based on at least one of the comb spacing number or the number of the plurality of SRS transmission occasions received at 1206. Here, the number of SRS transmission occasions represent how many SRS transmission occasions are included in each subset of consecutive SRS transmission occasions. For each symbol, a corresponding SRS comb offset value in the SRS hopping pattern may depend on the symbol number within the group of X consecutive symbols. That is, the SRS comb pattern may be determined based on $k_{offset}^{l'}$, and the SRS comb pattern may be the same for two different groups of X consecutive symbols. the SRS hopping pattern may be represented as $\bar{k}_0^{(p_i)} = n_{shift} N_{sc}^{RB} + (k_{TC}^{(p_i)} + k_{offset}^{l'} + f_{comboffset,hopping}(n_{s,f}^{\mu}, l_0)) \bmod K_{TC}$. Here, $k_{TC}^{(p_i)}$ may be determined based on (existing) RRC configured CombOffset($\bar{k}_{TC}$), $k_{offset}^{l'}$ may be a value in the comb offset pattern corresponding to symbol l' (e.g., the symbol of the SRS resource or the symbol within the group of consecutive symbols), and $f_{comboffset,hopping}(n_{s,f}^{\mu}, l_0)$ may be a comb offset hopping formula for determining a comb offset value common to all symbols of the group of X consecutive symbols, where $n_{s,f}^{\mu}$ may refer to slot number within frame, $l_0$ may refer to symbol number (within slot) of the first symbol of the group of X consecutive symbols, $K_{TC}$ may refer to comb spacing number. In one example, the comb offset hopping formula may be written based on a pseudo-random sequence c(i).

First, the number of SRS transmission occasions in the subset of consecutive SRS transmission occasions may be equal to a minimum of the comb spacing number and the number of the plurality of SRS transmission occasions. That is, the number of symbols in the group of consecutive symbols may be configured equal to the minimum of comb spacing and N. Accordingly, with the group of X consecutive symbols, all comb offsets may be sounded.

Second, the number of SRS transmission occasions in the subset of consecutive SRS transmission occasions may be the number of the plurality of SRS transmission occasions or a divisor of the number of the plurality of SRS transmission occasions that is not greater than the comb spacing number. That is, the number of symbols (e.g., X) in the group of consecutive OFDM symbols may be the number of the OFDM symbols of SRS (e.g., N) or a divisor of the number of the OFDM symbols of SRS (e.g., N) that is not greater than the comb spacing (e.g., $K_{TC}$). The case of X=N when N is larger than comb spacing (e.g., $K_{TC}$) may or may not be applicable.

In one example, a default number of SRS transmission occasions in the subset of consecutive SRS transmission occasions may be configured for the UE. That is, the UE and the network node may be configured with a default number of SRS transmission occasions in the subset of consecutive SRS transmission occasions for each possible combination. In another example, the number of SRS transmission occasions in the subset of consecutive SRS transmission occasions may be received from the network node at 1206 via the RRC message.

In another aspect, the SRS hopping pattern may be based at least in part on a slot number of the plurality of SRS transmission occasions within a radio frame and a symbol number of a first symbol of the subset of consecutive SRS transmission occasions within a slot In one example, the plurality of SRS transmission occasions may be configured to apply a TD-OCC across the subset of consecutive SRS transmission occasions. The SRS resource configured to apply the TD-OCC across a group of Y symbols may also be configured to apply the pseudo-random comb offset hopping, and the unit of hopping may be configured per group of Y OFDM symbols over which the TD-OCC is applied. That is, the group (or the subset) of consecutive symbols may correspond to a group of Y OFDM symbols over which the TD-OCC is configured to be applied. The hopping formula may be a function based at least in part on the slot number within the radio frame and the symbol number within the slot of the first symbol of the group of Y symbols. Accordingly, all SRS symbols over which TD-OCC is applied may have the same comb offset (e.g., occupy the same REs in the frequency domain) under the comb offset hopping pattern. In one aspect, the Y symbols may or may not be consecutive.

In another example, the plurality of SRS transmission occasions may be configured to apply a repetition of SRS across the subset of consecutive SRS transmission occasions. The SRS resource configured with repetition factor R may also be configured to apply the pseudo-random comb offset hopping, and the unit of hopping may be configured per group of R consecutive OFDM symbols that are in the same frequency hop. That is, the group (or the subset) of consecutive symbols may correspond to a group of R consecutive OFDM symbols over which R repetition of the SRS may be transmitted. The hopping formula may be a function based at least in part on the slot number within the radio frame and the symbol number within the slot of the first symbol of the group of R consecutive symbols. Accordingly, all SRS symbols in the same frequency hop may have the same comb offset (e.g., occupy the same REs in the frequency domain) under the comb offset hopping pattern.

The SRS comb offset pattern for the plurality of SRS transmission occasions may be selected based on the comb spacing number and the number of the plurality of SRS transmission occasions transmitted at 1206. In one aspect, the hopping offset of the plurality of SRS hopping pattern for each SRS transmission occasion is based at least in part on a symbol number of each SRS transmission occasion within the plurality of SRS transmission occasions. In another aspect, the hopping offset of the plurality of SRS hopping pattern for each SRS transmission occasion is based at least in part on a symbol number of each SRS transmission occasion within the subset of consecutive SRS transmission occasions. In one example, the same hopping offset may be associated with one or more subsets of hopping patterns. In another example, different hopping offsets may be associated with one or more subsets of hopping patterns.

At 1230, the network node may obtain a set of SRS across a plurality of SRS transmission occasions based on the SRS hopping pattern. The SRS hopping pattern may provide randomization while maintaining certain property of the staggered SRS comb pattern with uniformly spaced comb offsets, so that increased number of REs may be sounded uniformly. For example, at 830, the network node 804 may obtain a set of SRS across a plurality of SRS transmission occasions based on the SRS hopping pattern. Furthermore, 1230 may be performed by the SRS hopping configuring component 199.

Figure 13:
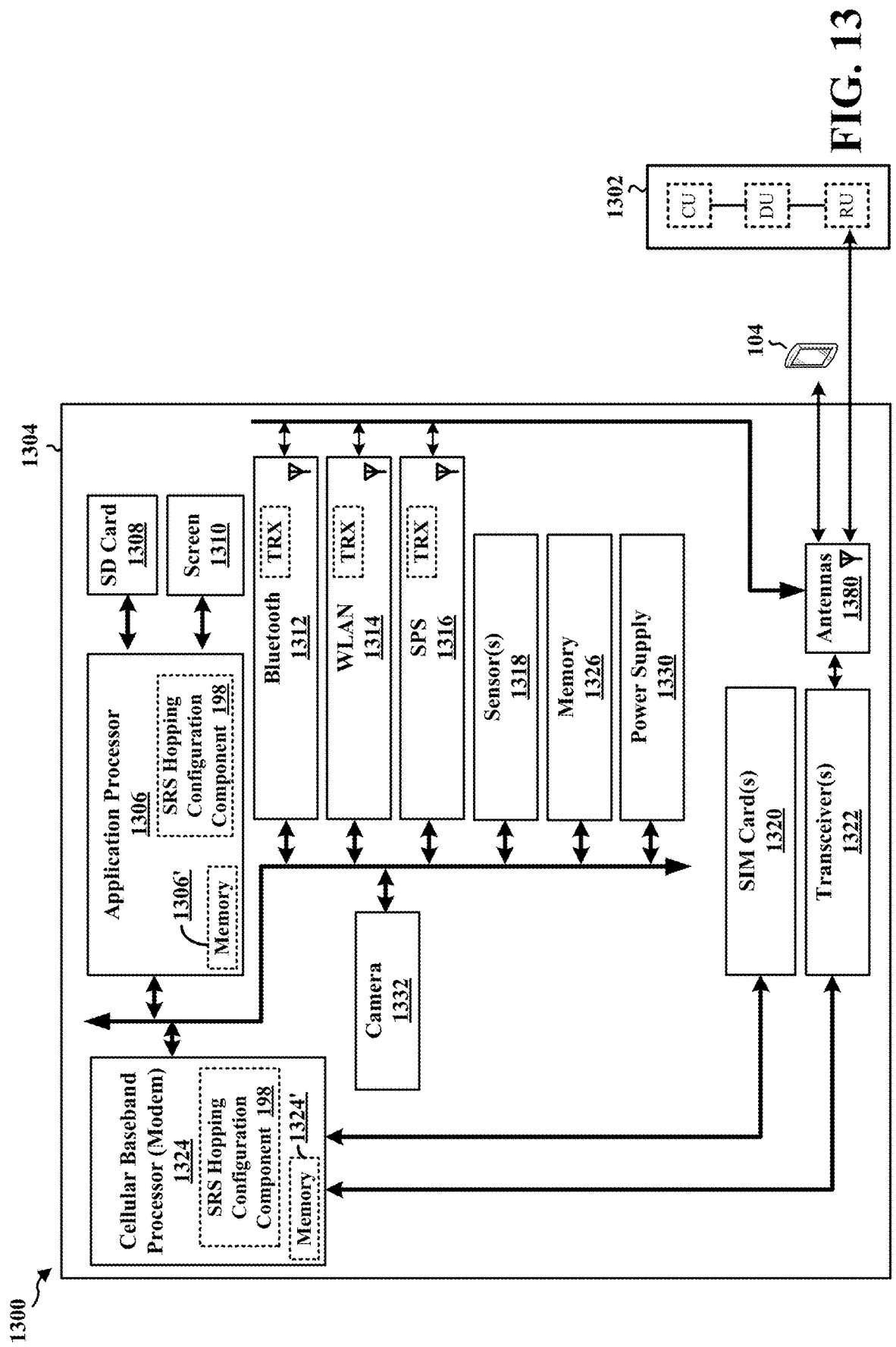
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1404 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the component 198 is configured to receive at least one SRS hopping configuration from a network node, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and transmit a set of SRS across a plurality of SRS transmission occasions based on the SRS hopping pattern. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving at least one SRS hopping configuration from a network node, means for obtaining an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and means for transmitting a set of SRS across a plurality of SRS transmission occasions based on the SRS hopping pattern. In one configuration, the means for obtaining the SRS hopping pattern is further configured to select an SRS comb offset pattern to generate a staggered SRS comb pattern for the plurality of SRS transmission occasions based on the at least one SRS hopping configuration, and apply the SRS comb offset pattern for the plurality of SRS transmission occasions relative to the hopping offset associated with one or more subsets of hopping patterns. In one configuration, the at least one SRS hopping configuration includes a comb spacing number and a number of the plurality of SRS transmission occasions, and where the SRS comb offset pattern for the plurality of SRS transmission occasions is selected based on the comb spacing number and the number of the plurality of SRS transmission occasions. In one configuration, the hopping offset of the plurality of SRS hopping pattern for each SRS transmission occasion is based at least in part on a symbol number of each SRS transmission occasion within the plurality of SRS transmission occasions. In one configuration, the hopping offset of the plurality of SRS hopping pattern for each SRS transmission occasion is based at least in part on a symbol number of each SRS transmission occasion within the subset of consecutive SRS transmission occasions. In one configuration, the at least one SRS hopping configuration includes a comb spacing number and a number of the plurality of SRS transmission occasions, and a number of SRS transmission occasions in the subset of consecutive SRS transmission occasions is based on at least one of the comb spacing number or the number of the plurality of SRS transmission occasions. In one configuration, the number of SRS transmission occasions in the subset of consecutive SRS transmission occasions is equal to a minimum of the comb spacing number and the number of the plurality of SRS transmission occasions. In one configuration, the number of SRS transmission occasions in the subset of consecutive SRS transmission occasions is the number of the plurality of SRS transmission occasions or a divisor of the number of the plurality of SRS transmission occasions that is not greater than the comb spacing number. In one configuration, the apparatus 1304, and in particular the cellular baseband processor 1324 and/or the application processor 1306, includes means for receiving, from the network node, the number of SRS transmission occasions in the subset of consecutive SRS transmission occasions via a RRC message. In one configuration, the apparatus 1304, and in particular the cellular baseband processor 1324 and/or the application processor 1306, is configured with a default number of SRS transmission occasions in the subset of consecutive SRS transmission occasions. In one configuration, the SRS hopping pattern is based at least in part on a slot number of the plurality of SRS transmission occasions within a radio frame and a symbol number of a first symbol of the subset of consecutive SRS transmission occasions within a slot. In one configuration, the plurality of SRS transmission occasions is applied with a TD-OCC across the subset of consecutive SRS transmission occasions. In one configuration, the plurality of SRS transmission occasions is applied with a repetition of SRS across the subset of consecutive SRS transmission occasions. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
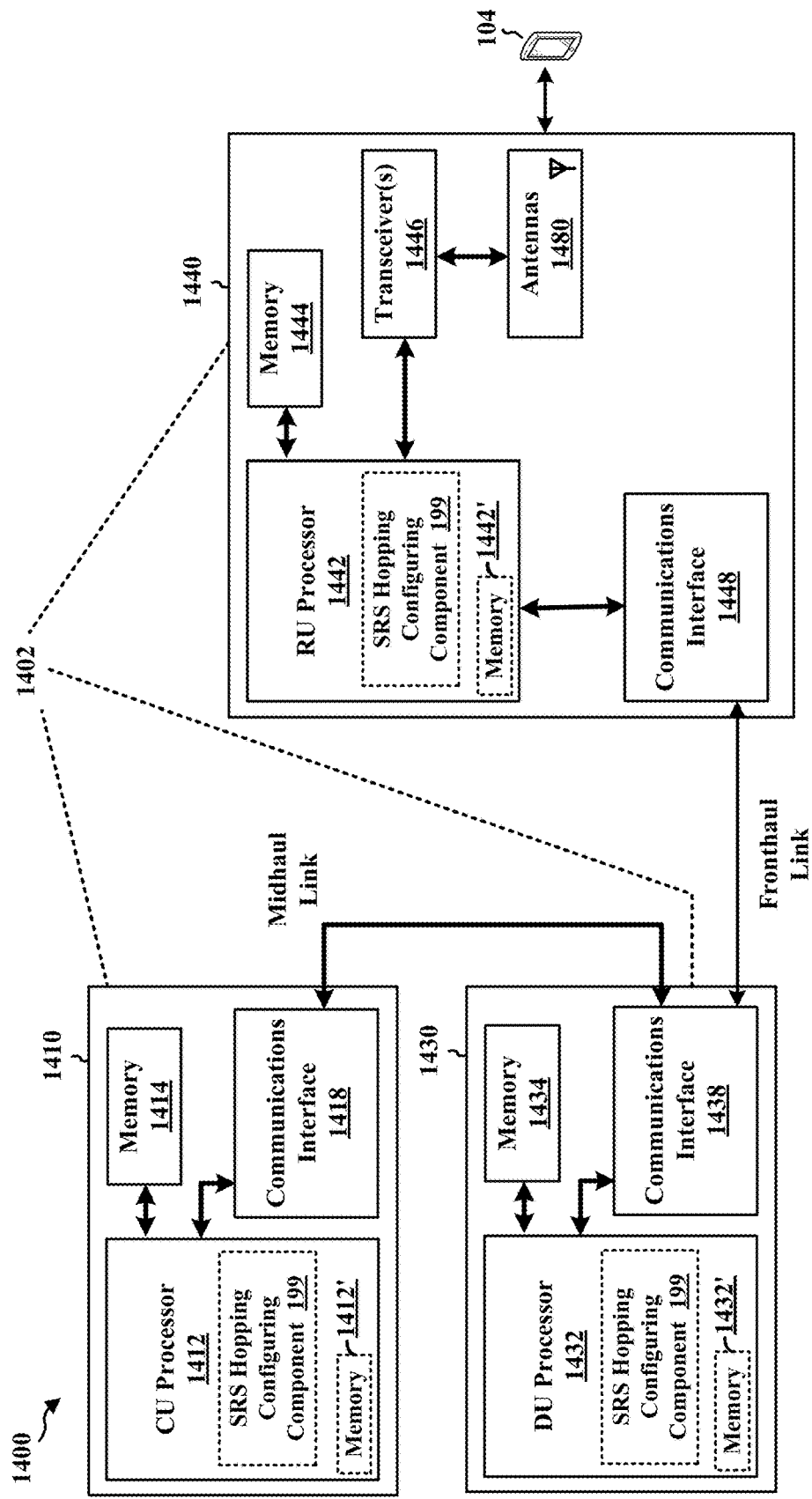
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit at least one SRS hopping configuration for a UE, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and obtain a set of SRS across a plurality of SRS transmission occasions based on the SRS hopping pattern. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting at least one SRS hopping configuration for a UE, means for obtaining an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and means for obtaining a set of SRS across a plurality of SRS transmission occasions based on the SRS hopping pattern. In one configuration, where the means for obtaining the SRS hopping pattern is further configured to select an SRS comb offset pattern to generate a staggered SRS comb pattern for the plurality of SRS transmission occasions based on the at least one SRS hopping configuration, and apply the SRS comb offset pattern for the plurality of SRS transmission occasions relative to the hopping offset associated with one or more subsets of hopping patterns. In one configuration, the at least one SRS hopping configuration includes a comb spacing number and a number of the plurality of SRS transmission occasions, and the SRS comb offset pattern for the plurality of SRS transmission occasions is selected based on the comb spacing number and the number of the plurality of SRS transmission occasions. In one configuration, the hopping offset of the plurality of SRS hopping pattern for each SRS transmission occasion is based at least in part on a symbol number of each SRS transmission occasion within the plurality of SRS transmission occasions. In one configuration, the hopping offset of the plurality of SRS hopping pattern for each SRS transmission occasion is based at least in part on a symbol number of each SRS transmission occasion within the subset of consecutive SRS transmission occasions. In one configuration, the at least one SRS hopping configuration includes a comb spacing number and a number of the plurality of SRS transmission occasions, and a number of SRS transmission occasions in the subset of consecutive SRS transmission occasions is based on at least one of the comb spacing number or the number of the plurality of SRS transmission occasions. In one configuration, the number of SRS transmission occasions in the subset of consecutive SRS transmission occasions is equal to a minimum of the comb spacing number and the number of the plurality of SRS transmission occasions. In one configuration, the number of SRS transmission occasions in the subset of consecutive SRS transmission occasions is the number of the plurality of SRS transmission occasions or a divisor of the number of the plurality of SRS transmission occasions that is not greater than the comb spacing number. In one configuration, the number of SRS transmission occasions in the subset of consecutive SRS transmission occasions is transmitted for the UE via a RRC message. In one configuration, a default number of SRS transmission occasions in the subset of consecutive SRS transmission occasions is configured to the UE and the network node. In one configuration, the SRS hopping pattern is based at least in part on a slot number of the plurality of SRS transmission occasions within a radio frame and a symbol number of a first symbol of the subset of consecutive SRS transmission occasions within a slot. In one configuration, the plurality of SRS transmission occasions is applied with a TD-OCC across the subset of consecutive SRS transmission occasions. In one configuration, the plurality of SRS transmission occasions is applied with a repetition of SRS across the subset of consecutive SRS transmission occasions. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
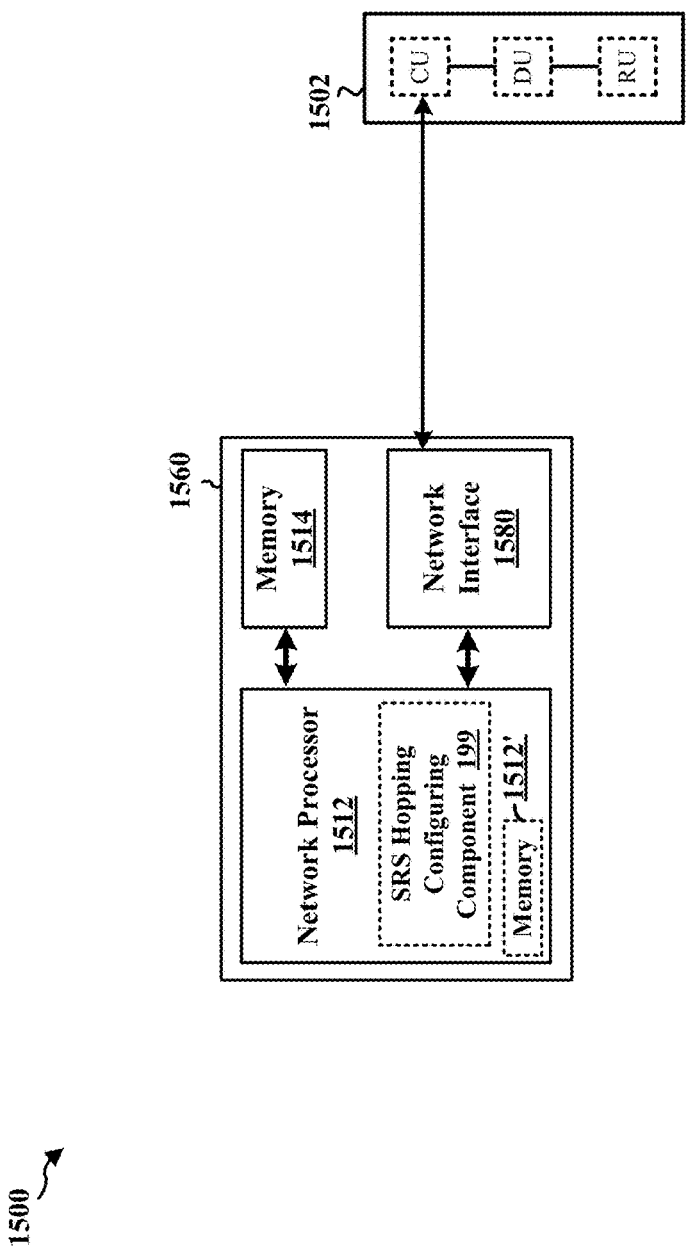
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The processor 1512 is responsible for general processing, including the execution of software stored on the computer-readable medium / memory. The software, when executed by the corresponding processor(s) causes the processor(s) to perform the various functions described supra. The computer-readable medium/memory may also be used for storing data that is manipulated by the processor(s) when executing software.

As discussed supra, the SRS hopping configuring component 199 is configured to transmit at least one SRS hopping configuration for a UE, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and obtain a set of SRS across a plurality of SRS transmission occasions based on the SRS hopping pattern. The SRS hopping configuring component 199 may be within the processor 1512. The SRS hopping configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 includes means for transmitting at least one SRS hopping configuration for a UE, means for obtaining an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and means for obtaining a set of SRS across a plurality of SRS transmission occasions based on the SRS hopping pattern. In one configuration, where the means for obtaining the SRS hopping pattern is further configured to select an SRS comb offset pattern to generate a staggered SRS comb pattern for the plurality of SRS transmission occasions based on the at least one SRS hopping configuration, and apply the SRS comb offset pattern for the plurality of SRS transmission occasions relative to the hopping offset associated with one or more subsets of hopping patterns. In one configuration, the at least one SRS hopping configuration includes a comb spacing number and a number of the plurality of SRS transmission occasions, and the SRS comb offset pattern for the plurality of SRS transmission occasions is selected based on the comb spacing number and the number of the plurality of SRS transmission occasions. In one configuration, the hopping offset of the plurality of SRS hopping pattern for each SRS transmission occasion is based at least in part on a symbol number of each SRS transmission occasion within the plurality of SRS transmission occasions. In one configuration, the hopping offset of the plurality of SRS hopping pattern for each SRS transmission occasion is based at least in part on a symbol number of each SRS transmission occasion within the subset of consecutive SRS transmission occasions. In one configuration, the at least one SRS hopping configuration includes a comb spacing number and a number of the plurality of SRS transmission occasions, and a number of SRS transmission occasions in the subset of consecutive SRS transmission occasions is based on at least one of the comb spacing number or the number of the plurality of SRS transmission occasions. In one configuration, the number of SRS transmission occasions in the subset of consecutive SRS transmission occasions is equal to a minimum of the comb spacing number and the number of the plurality of SRS transmission occasions. In one configuration, the number of SRS transmission occasions in the subset of consecutive SRS transmission occasions is the number of the plurality of SRS transmission occasions or a divisor of the number of the plurality of SRS transmission occasions that is not greater than the comb spacing number. In one configuration, the number of SRS transmission occasions in the subset of consecutive SRS transmission occasions is transmitted for the UE via a RRC message. In one configuration, a default number of SRS transmission occasions in the subset of consecutive SRS transmission occasions is configured to the UE and the network node. In one configuration, the SRS hopping pattern is based at least in part on a slot number of the plurality of SRS transmission occasions within a radio frame and a symbol number of a first symbol of the subset of consecutive SRS transmission occasions within a slot. In one configuration, the plurality of SRS transmission occasions is applied with a TD-OCC across the subset of consecutive SRS transmission occasions. In one configuration, the plurality of SRS transmission occasions is applied with a repetition of SRS across the subset of consecutive SRS transmission occasions. The means may be the SRS hopping configuring component 199 of the network entity 1560 configured to perform the functions recited by the means.

According to some aspects of the current disclosure, a UE may be configured to receive at least one SRS hopping configuration from a network node, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and transmit a set of SRS across a plurality of SRS transmission occasions based on the SRS hopping pattern. A network node may also be configured to transmit at least one SRS hopping configuration for a UE, obtain an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and obtain a set of SRS across a plurality of SRS transmission occasions based on the SRS hopping pattern. The SRS hopping pattern may provide randomization while maintaining certain property of the staggered SRS comb pattern with uniformly spaced comb offsets, so that increased number of REs may be sounded uniformly.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising receiving at least one SRS hopping configuration from a network node, obtaining an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and transmitting a set of SRS across a plurality of SRS transmission occasions based on the SRS hopping pattern.

Aspect 2 is the method of aspect 1, where obtaining the SRS hopping pattern further includes selecting an SRS comb offset pattern to generate a staggered SRS comb pattern for the plurality of SRS transmission occasions based on the at least one SRS hopping configuration, and applying the SRS comb offset pattern for the plurality of SRS transmission occasions relative to the hopping offset associated with one or more subsets of hopping patterns.

Aspect 3 is the method of aspect 2, where the at least one SRS hopping configuration includes a comb spacing number and a number of the plurality of SRS transmission occasions, and the SRS comb offset pattern for the plurality of SRS transmission occasions is selected based on the comb spacing number and the number of the plurality of SRS transmission occasions.

Aspect 4 is the method of any of aspects 2 and 3, where the hopping offset of the plurality of SRS hopping pattern for each SRS transmission occasion is based at least in part on a symbol number of each SRS transmission occasion within the plurality of SRS transmission occasions.

Aspect 5 is the method of any of aspects 2 to 4, where the hopping offset of the plurality of SRS hopping pattern for each SRS transmission occasion is based at least in part on a symbol number of each SRS transmission occasion within the subset of consecutive SRS transmission occasions.

Aspect 6 is the method of any of aspects 1 to 3, where the at least one SRS hopping configuration includes a comb spacing number and a number of the plurality of SRS transmission occasions, and a number of SRS transmission occasions in the subset of consecutive SRS transmission occasions is based on at least one of the comb spacing number or the number of the plurality of SRS transmission occasions.

Aspect 7 is the method of aspect 6, where the number of SRS transmission occasions in the subset of consecutive SRS transmission occasions is equal to a minimum of the comb spacing number and the number of the plurality of SRS transmission occasions.

Aspect 8 is the method of any of aspects 6 and 7, where the number of SRS transmission occasions in the subset of consecutive SRS transmission occasions is the number of the plurality of SRS transmission occasions or a divisor of the number of the plurality of SRS transmission occasions that is not greater than the comb spacing number.

Aspect 9 is the method of aspect 8, further including receiving, from the network node, the number of SRS transmission occasions in the subset of consecutive SRS transmission occasions via a RRC message.

Aspect 10 is the method of any of aspects 8 and 9, where the UE is configured with a default number of SRS transmission occasions in the subset of consecutive SRS transmission occasions.

Aspect 11 is the method of any of aspects 1 to 10, where the SRS hopping pattern is based at least in part on a slot number of the plurality of SRS transmission occasions within a radio frame and a symbol number of a first symbol of the subset of consecutive SRS transmission occasions within a slot.

Aspect 12 is the method of aspect 11, where the plurality of SRS transmission occasions is applied with a TD-OCC across the subset of consecutive SRS transmission occasions.

Aspect 13 is the method of any of aspects 11 and 12, where the plurality of SRS transmission occasions is applied with a repetition of SRS across the subset of consecutive SRS transmission occasions.

Aspect 14 is an apparatus for wireless communication including at least one processor coupled to a memory and configured to implement any of aspects 1 to 13, further including a transceiver coupled to the at least one processor.

Aspect 15 is an apparatus for wireless communication including means for implementing any of aspects 1 to 13.

Aspect 16 is a non-transitory computer-readable medium storing computer executable code, where the code when executed by a processor causes the processor to implement any of aspects 1 to 13.

Aspect 17 is a method of wireless communication at a UE, comprising transmitting at least one SRS hopping configuration for a UE, obtaining an SRS hopping pattern based on the at least one SRS hopping configuration and at least one hopping offset, the SRS hopping pattern including one or more subsets of hopping patterns, and each subset of hopping patterns including a subset of consecutive SRS transmission occasions associated with a hopping offset of the at least one hopping offset, and obtaining a set of SRS across a plurality of SRS transmission occasions based on the SRS hopping pattern.

Aspect 18 is the method of aspect 17, where obtaining the SRS hopping pattern further includes selecting an SRS comb offset pattern to generate a staggered SRS comb pattern for the plurality of SRS transmission occasions based on the at least one SRS hopping configuration, and applying the SRS comb offset pattern for the plurality of SRS transmission occasions relative to the hopping offset associated with one or more subsets of hopping patterns.

Aspect 19 is the method of aspect 18, where the at least one SRS hopping configuration includes a comb spacing number and a number of the plurality of SRS transmission occasions, and the SRS comb offset pattern for the plurality of SRS transmission occasions is selected based on the comb spacing number and the number of the plurality of SRS transmission occasions.

Aspect 20 is the method of any of aspects 18 and 19, where the hopping offset of the plurality of SRS hopping pattern for each SRS transmission occasion is based at least in part on a symbol number of each SRS transmission occasion within the plurality of SRS transmission occasions.

Aspect 21 is the method of any of aspects 18 to 20, where the hopping offset of the plurality of SRS hopping pattern for each SRS transmission occasion is based at least in part on a symbol number of each SRS transmission occasion within the subset of consecutive SRS transmission occasions.

Aspect 22 is the method of any of aspects 17 to 21, where the at least one SRS hopping configuration includes a comb spacing number and a number of the plurality of SRS transmission occasions, and a number of SRS transmission occasions in the subset of consecutive SRS transmission occasions is based on at least one of the comb spacing number or the number of the plurality of SRS transmission occasions.

Aspect 23 is the method of aspect 22, where the number of SRS transmission occasions in the subset of consecutive SRS transmission occasions is equal to a minimum of the comb spacing number and the number of the plurality of SRS transmission occasions.

Aspect 24 is the method of any of aspects 22 and 23, where the number of SRS transmission occasions in the subset of consecutive SRS transmission occasions is the number of the plurality of SRS transmission occasions or a divisor of the number of the plurality of SRS transmission occasions that is not greater than the comb spacing number.

Aspect 25 is the method of aspect 24, further including transmitting, to the UE, the number of SRS transmission occasions in the subset of consecutive SRS transmission occasions via a RRC message.

Aspect 26 is the method of aspect 24 or 25, where the UE is configured with a default number of SRS transmission occasions in the subset of consecutive SRS transmission occasions.

Aspect 27 is the method of any of aspects 17 to 26, where the SRS hopping pattern is based at least in part on a slot number of the plurality of SRS transmission occasions within a radio frame and a symbol number of a first symbol of the subset of consecutive SRS transmission occasions within a slot.

Aspect 28 is the method of aspect 27, where the plurality of SRS transmission occasions is applied with a TD-OCC across the subset of consecutive SRS transmission occasions.

Aspect 29 is the method of any of aspects 27 and 28, where the plurality of SRS transmission occasions is applied with a repetition of SRS across the subset of consecutive SRS transmission occasions.

Aspect 30 is an apparatus for wireless communication including at least one processor coupled to a memory and configured to implement any of aspects 17 to 29, further including a transceiver coupled to the at least one processor.

Aspect 31 is an apparatus for wireless communication including means for implementing any of aspects 17 to 29.

Aspect 32 is a non-transitory computer-readable medium storing computer executable code, where the code when executed by a processor causes the processor to implement any of aspects 17 to 29.

What is claimed is:

1. An apparatus for wireless communication at a user equipment (UE), comprising:
   memory; and
   at least one processor coupled to the memory and, based at least in part on information stored in the memory, the at least one processor is configured to:
     receive at least one sounding reference signal (SRS) hopping configuration from a network node; and
     transmit a set of SRS across a plurality of SRS transmission occasions with an SRS hopping pattern based on the at least one SRS hopping configuration and at least one hopping offset, wherein the SRS hopping pattern includes a comb offset hopping pattern based on a subset of consecutive SRS transmission occasions, wherein the comb offset hopping pattern based on determined based at least in part on a symbol number of a first symbol of the subset of consecutive SRS transmission occasions within a slot.

2. The apparatus of claim 1, wherein
   the comb offset hopping pattern includes a staggered SRS comb pattern for the plurality of SRS transmission occasions based on the at least one SRS hopping configuration.

3. The apparatus of claim 2, wherein the at least one SRS hopping configuration includes a comb spacing number and a number of the plurality of SRS transmission occasions,
   wherein the comb offset hopping pattern for the plurality of SRS transmission occasions is further based on the comb spacing number and the number of the plurality of SRS transmission occasions.

4. The apparatus of claim 1, further comprising a transceiver coupled to the at least one processor,
   wherein the SRS hopping pattern is further based at least in part on a slot number of the plurality of SRS transmission occasions within a radio frame.

5. The apparatus of claim 4, wherein the plurality of SRS transmission occasions is applied with a time domain orthogonal cover codes (TD-OCC) across the subset of consecutive SRS transmission occasions.

6. The apparatus of claim 4, wherein the plurality of SRS transmission occasions is based on a repetition of SRS across the subset of consecutive SRS transmission occasions.

7. The apparatus of claim 1, wherein the at least one SRS hopping configuration indicates an SRS repetition across a number of symbols, and wherein the subset of consecutive SRS transmission occasions corresponds to the number of symbols for the SRS repetition.

8. The apparatus of claim 1, wherein the subset of consecutive SRS transmission occasions corresponds to R consecutive symbols of a same frequency hop, wherein R is a repetition factor from the at least one SRS hopping configuration.

9. The apparatus of claim 8, wherein SRS transmissions in the subset of consecutive SRS transmission occasions for the same frequency hop have a same comb offset.

10. An apparatus for wireless communication at a network node, comprising:
    memory; and
    at least one processor coupled to the memory and, based at least in part on information stored in the memory, the at least one processor is configured to:
      transmit at least one sounding reference signal (SRS) hopping configuration for a user equipment (UE); and receive a set of SRS across a plurality of SRS transmission occasions with an SRS hopping pattern that is based on the at least one SRS hopping configuration and at least one hopping offset, wherein the SRS hopping pattern includes a comb offset hopping pattern based on a subset of consecutive SRS transmission occasions, wherein the comb offset hopping pattern is determined based at least in part on a symbol number of a first symbol of the subset of consecutive SRS transmission occasions within a slot.

11. The apparatus of claim 10, wherein
the comb offset hopping pattern includes a staggered SRS comb pattern for the plurality of SRS transmission occasions based on the at least one SRS hopping configuration.

12. The apparatus of claim 11, wherein the at least one SRS hopping configuration includes a comb spacing number and a number of the plurality of SRS transmission occasions,
wherein the comb offset hopping pattern for the plurality of SRS transmission occasions is further based on the comb spacing number and the number of the plurality of SRS transmission occasions.

13. The apparatus of claim 10, further comprising a transceiver coupled to the at least one processor,
wherein the SRS hopping pattern is further based at least in part on a slot number of the plurality of SRS transmission occasions within a radio frame.

14. The apparatus of claim 13, wherein the plurality of SRS transmission occasions is applied with a time domain orthogonal cover codes (TD-OCC) across the subset of consecutive SRS transmission occasions.

15. The apparatus of claim 13, wherein the plurality of SRS transmission occasions is based on a repetition of SRS across the subset of consecutive SRS transmission occasions.

16. The apparatus of claim 10, wherein the at least one SRS hopping configuration indicates SRS repetition across a number of symbols, and wherein the subset of consecutive SRS transmission occasions corresponds to the number of symbols for the SRS repetition.

17. The apparatus of claim 10, wherein the subset of consecutive SRS transmission occasions corresponds to R consecutive symbols of a same frequency hop, wherein R is a repetition factor from the at least one SRS hopping configuration.

18. The apparatus of claim 17, wherein SRS transmissions in the subset of consecutive SRS transmission occasions for the same frequency hop have a same comb offset.

19. A method of wireless communication at a user equipment (UE), comprising:
receiving at least one sounding reference signal (SRS) hopping configuration from a network node; and
transmitting a set of SRS across a plurality of SRS transmission occasions with an SRS hopping pattern based on the at least one SRS hopping configuration and at least one hopping offset, wherein the SRS hopping pattern includes a comb offset hopping pattern based on a subset of consecutive SRS transmission occasions, wherein the comb offset hopping pattern is determined based at least in part on a symbol number of a first symbol of the subset of consecutive SRS transmission occasions within a slot.

20. The method of claim 19, wherein
the comb offset hopping pattern includes a staggered SRS comb pattern for the plurality of SRS transmission occasions based on the at least one SRS hopping configuration.

21. The method of claim 19, wherein the at least one SRS hopping configuration indicates an SRS repetition across a number of symbols, and wherein the subset of consecutive SRS transmission occasions corresponds to the number of symbols for the SRS repetition.

22. The method of claim 19, wherein the subset of consecutive SRS transmission occasions corresponds to R consecutive symbols of a same frequency hop, wherein R is a repetition factor from the at least one SRS hopping configuration.

23. The method of claim 22, wherein SRS transmissions in the subset of consecutive SRS transmission occasions for the same frequency hop have a same comb offset.

24. The method of claim 19, wherein the SRS hopping pattern is further based at least in part on a slot number of the plurality of SRS transmission occasions within a radio frame.

25. The method of claim 24, wherein the plurality of SRS transmission occasions is based on a repetition of SRS across the subset of consecutive SRS transmission occasions.

26. A method of wireless communication at a network node, comprising:
transmitting at least one sounding reference signal (SRS) hopping configuration for a user equipment (UE); and
receiving a set of SRS across a plurality of SRS transmission occasions with an SRS hopping pattern based on the at least one SRS hopping configuration and at least one hopping offset, wherein the SRS hopping pattern includes a comb offset hopping pattern based on a subset of consecutive SRS transmission occasions, wherein the comb offset hopping pattern is determined based at least in part on a symbol number of a first symbol of the subset of consecutive SRS transmission occasions within a slot.

27. The method of claim 26, wherein
the comb offset hopping pattern includes a staggered SRS comb pattern for the plurality of SRS transmission occasions based on the at least one SRS hopping configuration.

28. The method of claim 26, wherein the at least one SRS hopping configuration indicates an SRS repetition across a number of symbols, and wherein the subset of consecutive SRS transmission occasions corresponds to the number of symbols for the SRS repetition.

29. The method of claim 26, wherein the subset of consecutive SRS transmission occasions corresponds to R consecutive symbols of a same frequency hop, wherein R is a repetition factor from the at least one SRS hopping configuration.

30. The method of claim 29, wherein SRS transmissions in the subset of consecutive SRS transmission occasions for the same frequency hop have a same comb offset.

31. The method of claim 26, wherein the SRS hopping pattern is further based at least in part on a slot number of the plurality of SRS transmission occasions within a radio frame.

32. The method of claim 31, wherein the plurality of SRS transmission occasions is based on a repetition of SRS across the subset of consecutive SRS transmission occasions.

* * * * *